United States Patent [19]
Goldwasser et al.

[11] Patent Number: 5,768,388
[45] Date of Patent: Jun. 16, 1998

[54] TIME DELAYED KEY ESCROW

[76] Inventors: Shafi Goldwasser, 153 Upland St., Cambridge, Mass. 02140-3626; Mihir Bellare, 7180 Shoreline Dr., #5210, San Diego, Calif. 92122

[21] Appl. No.: 622,040

[22] Filed: Mar. 21, 1996

Related U.S. Application Data

[60] Provisional application No. 60/005,339, Oct. 17, 1995, provisional application No. 60/007,395, Nov. 21, 1995 and provisional application No. 60/012,647, Mar. 1, 1996.

[51] Int. Cl.$^6$ .............................. H04K 1/00; H04L 9/00
[52] U.S. Cl. .............................................. 380/30; 380/23
[58] Field of Search ................................ 380/23, 25, 30

[56] References Cited

U.S. PATENT DOCUMENTS

| | | | |
|---|---|---|---|
| 4,879,747 | 11/1989 | Leighton et al. | 380/23 |
| 4,944,009 | 7/1990 | Micali et al. | 380/46 |
| 4,995,081 | 2/1991 | Leighton et al. | 380/23 |
| 5,016,274 | 5/1991 | Micali et al. | 380/23 |
| 5,276,737 | 1/1994 | Micali | 380/30 |
| 5,351,302 | 9/1994 | Leighton et al. | 380/30 |
| 5,420,927 | 5/1995 | Micali | 380/23 |
| 5,432,852 | 7/1995 | Leighton et al. | 380/30 |

OTHER PUBLICATIONS

Bellare et al., The (True) Complexity of Statistical Zero Knowledge. Procs. of the 22nd Ann. Symposium on Theory of Computing, ACM, 1990.

Bellare et al., On Defining Proofs of Knowledge. Advances in Cryptology—Crypto 92 Proceedings, Lecture Notes in Computer Science, vol. 740, pp. 390–420, 1992.

Bellare et al., Translucent Cryptography—An Alternative to Key Escrow and Its Implementation via Fractional Oblivious Transfer. MIT/LCS TM 683, Feb. 1996.

Bellare et al., Random Oracles are Practical: A Paradigm for Designing Efficient Protocols. Procs. of the First ACM Conf. on Computer and Communications Security, ACM, Nov. 1993.

Bellare et al., Optimal Asymmetric Encryption. Advances in Cryptology—Eurocrypt 94 Procs., Lecture Notes in Comp. Science, vol. 950, pp. 92–111, 1994.

Beth et al., Towards Acceptable Key Escrow Systems. Procs. of the Second Ann. Conf. on Computer and Communications Security, ACM, 1994.

Blakely, Safeguarding Cryptographic Keys. AFIPS Conf. Procs., Jun. 1979.

Blaze, Protocal Failure in the Escrowed Encryption Standard. Procs. of the Second Ann. Conf. on Computer and Communications Security, ACM, 1994.

Blum et al., An Efficient Probabilistic Public–Key Encryption Scheme Which Hides All Partial Information. Advances in Cryptology—Crypto 84 Procs., Lecture Notes in Computer Science, vol. 196, pp. 289–299, 1984.

Boyar et al., A Discrete Logarithm Blob for Non–Interactive XOR Gates. DAIMI PB—327, Computer Science Dept., Aarhus Univ., Aug. 1990.

(List continued on next page.)

*Primary Examiner*—Stephen C. Buczinski
*Attorney, Agent, or Firm*—Fish & Richardson P.C.

[57] ABSTRACT

Methods for designing encryption algorithms with different levels of security for different parties: "easier" (but requiring some work nonetheless) to break for some parties (e.g., the government) than for other parties (the adversaries at large). This is achieved by a new form of key escrow in which the government gets some information related to the secret keys of individuals but not the secret keys themselves. The information given to the government enables it to decrypt with a predetermined level of computational difficulty less than that for adversaries at large. The new key escrow methods are verifiable. Verification information can be provided to the government so that it can verify that the information escrowed is sufficient to enable it to decrypt with the predetermined level of computational difficulty. The fact that the government must perform some computation to break the encryption schemes of individual users provides a serious deterrent against massive wiretapping.

14 Claims, 4 Drawing Sheets

OTHER PUBLICATIONS

Brassard et al., Constant–Round Perfect Zero–Knowledge Computationally Convincing Protocols. Theoretical Computer Science, vol. 84, No. 1, pp. 23–52, 1991.

Chor et al., Verifiable Secret Sharing and Achieving Simultaneity in the Presence of Faults. Procs. of the 27th Symposium on Foundations of Computer Science, IEEE, 1986.

Cramer et al., Proofs of Partial Knowledge and Simplified Design of Witness Hiding Protocols. Advances in Cryptology—Crypto 94 Procs., Lecture Notes in Comp. Science, vol. 839, pp. 174–187, 1994.

Denning, To Tap or Not to Tap. CACM, 1993.

Denning et al., Key Escrowing Today. IEEE Communications Magazine, vol. 32, No. 9, Sep. 1994.

Desmedt, Securing Traceability of Ciphertexts—Towards a Secure Software Key Escrow System. Advances in Cryptology—Eurocrypt 95 Procs., Lecture Notes in Comp. Science, vol. 921, pp. 147–157, 1992.

Diffie et al., New Directions in Cryptography. IEEE Trans. Info. Theory, vol. IT–22, No. 6, pp. 644–654, 1976.

Feige et al., Witness Indistinguishable and Witness Hiding Protocols. Procs. of the 22nd Ann. Symp. on Theory of Computing, ACM, 1990.

Feldman, A Practical Scheme for Non–Interactive Verifiable Secret Sharing. Procs. of the 28th Symp. on Foundations of Computer Science, IEEE, 1987.

Frankel et al., Escrow Encryption Systems Visited: Attacks, Analysis and Designs. Advances in Cryptology—Crypto 95 Procs., Lecture Notes in Comp. Science, vol. 963, 1995.

Goldreich et al., Proofs that Yield Nothing but Their Validity, or all Languages in NP have Zero–Knowledge Proof Systems. JACM, vol. 38, No. 1, Jul. 1991.

Goldwasser et al., The Knowledge Complexity of Interactive Proof Systems, SIAM J. Comput., vol. 18, No. 1, pp. 186–208, Feb. 1989.

Goldwasser et al., A Digital Signature Scheme Secure Against Adaptive Chosen–Message Attacks, SIAM J. Computing, 17(2):281–308, Apr. 1988.

Kilian et al., Fair Cryptosystems, Revisited. Advances in Cryptology—Crypto 95 Procs., Lecture Notes in Computer Science, vol. 963, 1995.

Lenstra, Factoring Integers with Elliptic Curves. Annals of Math, vol. 126, pp. 649–673, 1987.

Lenstra et al., A Key Escrow System with Warrent Bounds. Advances in Cryptology—Crypto 95 Procs., Lecture Notes in Comp. Science, vol. 963, 1995.

Micali, Fair Public–Key Cryptosystems. Advances in Cryptology—Crypto 92 Procs., Lecture Notes in Comp. Science, vol. 740, pp. 113–138, 1992.

Micali, Guaranteed Partial Key–Escrow. MIT/LCS TM–537, Sep. 1995.

Micali et al., A Simple Method for Generating . . . Clipper–Like Key Escrow Systems. Advances in Cryptology—Crypto 95 Procs., Lecture Notes in Comp. Science, vol. 963, 1995.

Odlyzko, CryptoBytes. RSA Lab Newsletter, vol. 1, No. 2.

Pederson, Distributed Provers with Applications to Undeniable Signatures. Advances in Cryptology—Eurocrypt 91 Procs., Lecture Notes in Comp. Science, vol. 547, pp. 221–238, 1991.

Pederson, Non–Interactive and Information–Theoretic Secure Verifiable Secret Sharing, Advances in Cryptology—Crypto 91 Procs., Lecture Notes in Comp. Science, vol. 576, pp. 129–140, 1991.

Rivest, The RC5 Encryption Algorithm. Manuscript.

Rivest et al., A Method for Obtaining Digital Signatures and Public–Key Cryptosystems. CACM, vol. 21, 1978.

Rivest et al., Time–Lock Puzzles and Timed–Release Crypto. Manuscript.

Shamir, How to Share a Secret. CACM, vol. 22, No. 11, 1979.

Denning, Descriptions of Key Escrow Systems, Version of Jan. 21, 1996.

System wide constants—

$n$ — Number of trustees (say $n = 5$)
$t$ — Assumed bound on number of bad trustees (say $t = 3$)
$p = 2q + 1$ — Prime of length at least 512
$G \subseteq Z_p^*$ — Group of prime order $q$
$g \in Z_p^*$ — Random generator of $G$
$h \in Z_p^*$ — Random generator of $G$ with $\log_g(h)$ unknown

User keys and their components—

$S = x + a \mod q$ — Private key of User
$P = g^{x+a} \in G$ — Public key of User
$a = a_0 2^0 + a_1 2^1 + \cdots + a_{2l-1} 2^{2l-1}$ ($a_i \in \{0,1\}$) — Short ($2l$ bits) component of $S$
$x \in Z_q$ — Long component of $S$, escrowed with trustees

Protocol

1. COMMITMENTS: The user chooses $u \in Z_q$ and $u_0, \ldots, u_{2l-1} \in Z_q$ at random. He lets $X = g^x h^u$ and $A_i = g^{a_i} h^{u_i}$ for $i = 0, \ldots, 2l-1$. He sends $X, A_0, \ldots, A_{2l-1}$ to the trustees.

2. PROOF THAT COMMITMENTS DEFINE THE KEY: He also lets $w = u + u_0 2^0 + u_1 2^1 + \cdots + u_{2l-1} 2^{2l-1} \mod q$ and sends $w$ to the trustees. Each trustee checks that $P \cdot h^w = X \cdot A_0^{2^0} \cdot A_1^{2^1} \cdots A_{2l-1}^{2^{2l-1}}$.

3. ESCROW OF LARGE COMPONENT: The user shares $x$ via Pederson's information theoretically secure VSS [Pe2], based on the initial commitment $X$.

4. PROOF OF SMALLNESS OF SMALL COMPONENT: The user proves that each $A_i$ is a committal to either 0 or 1, as follows. For each trustee $T$ and each $i = 0, \ldots, 2l - 1$:
   - The user and $T$ execute, $\lceil 100/(n-t) \rceil$ times independently in parallel, the atomic proof of knowledge of de-committal of $A_i$, by running protocol KOD of Figure 2 on common input $A_i$.
   - In these executions, the user is the prover and the trustee is the verifier.

FIG. 1

System wide constants—

$n$ — Number of trustees (say $n = 5$)
$t$ — Assumed bound on number of bad trustees (say $t = 3$)
$k$ — security parameter of cryptosystem
$m$ — A security parameter, say $m = 100n/(n - t)$
$k_2$ — Security parameter controlling degree of time delay

User keys and their components—

$sk$ — secret key of user
$pk$ — public key of user

Protocol: Repeat the following protocol, independently, $m$ times—

1. SET-UP: User chooses a random triple $(x, y, s) \in D_0 \times D_1 \times D$ such that $f_0(x) = f_1(y) = s$. He picks a random $k_2$ bit key $K$ and forms the ciphertext $C = E_K(x)$. He sends $s$ to the trustees.

2. ESCROW: User sets $a_0 = C$ and picks at random $a_1, \ldots, a_t \in F$, where $F$ is a field. He sets $f(x) = a_0 + a_1 x + \cdots + a_t x^t \in F[x]$. For $j = 1, \ldots, n$ he sends $f(j)$ to trustee $j$ over a private channel.

3. CHALLENGE: The trustees send the user a random bit $c$.

4. RESPONSE:
   - If $c = 0$ then the user sends $y$ to the trustees and they check that $y \in D_1$ and $f_1(y) = s$
   - If $c = 1$ then the user sends $a_0, \ldots, a_t$ and $K$ to the trustees. Letting $f(x) = a_0 + a_1 x + \cdots + a_t x^t$, trustee $j$ checks that he had indeed received share $f(j)$ in Step 2.2. Trustees check that $|K| = k_2$. They then compute $E_K^{-1}(C)$ and call this $x$. They check that $f_0(x) = s$.

FIG. 3

System wide constants—
- $n$ — Number of trustees (say $n = 5$)
- $t$ — Assumed bound on number of bad trustees (say $t = 3$)
- $k$ — length of modulus, at least 512
- $m$ — A security parameter, say $m = 100n/(n - t)$
- $k_2$ — Security parameter controlling degree of time delay

User keys and their components—
- $p, q$ — Primes which constitute private key of user
- $N = pq$ — $k$-bit public modulus of user

Protocol:

1. PROVE $N$ IS THE PRODUCT OF TWO PRIMES: This can be done via some standard ZK protocol. For example, user and trustee flip coins in the well to obtain 500 random elements of $Z_N^*$, and user shows that 100 of them are quadratic residues by providing square roots. Also trustees check that $N$ is not prime.

2. Repeat the following protocol, independently, $m$ times—

2.1. SET-UP: User chooses at random $y \in Z_N^{-1}$ and sets $s = y^2 \bmod N$. He computes a Jacobi symbol $+1$ square root $x \in Z_N^{+1}$ of $s$. He picks a random $k_2$ bit key $K$ and forms the ciphertext $C = E_K(x)$. He sends $s$ to the trustees.

2.2. ESCROW: User sets $\alpha_0 = C$ and picks at random $\alpha_1, \ldots, \alpha_t \in Z_N^*$. He sets $f(x) = \alpha_0 + \alpha_1 x + \cdots + \alpha_t x^t \in Z_N^*[x]$. For $j = 1, \ldots, n$ he sends $f(j)$ to trustee $j$ over a private channel.

2.3. CHALLENGE: The trustees send the user a random bit $c$.

2.4. RESPONSE:
    - If $c = 0$ then the user sends $y$ to the trustees and they check that $J_N(y) = -1$ and $y^2 = s \bmod N$.
    - If $c = 1$ then the user sends $\alpha_0, \ldots, \alpha_t$ and $K$ to the trustees. Letting $f(x) = \alpha_0 + \alpha_1 x + \cdots + \alpha_t x^t$, trustee $j$ checks that he had indeed received share $f(j)$ in Step 2.2. Trustees check that $|K| = k_2$. They then compute $E_K^{-1}(C)$ and call this $x$. They check that $J_N(x) = +1$ and $x^2 = s \bmod N$.

FIG. 4

TIME DELAYED KEY ESCROW

CROSS REFERENCE TO RELATED APPLICATIONS

This application claims priority from Provisional Application Ser. No. 60/012,647, filed on Mar. 1, 1996, Provisional Application Ser. No. 60/007,395, filed Nov. 21, 1995, and Provisional Application Ser. No. 60/005,339, filed Oct. 17, 1995.

BACKGROUND OF THE INVENTION

This invention relates to the field of cryptography. Cryptography offers several different types of encryption methods, which enable parties to communicate privately over insecure public communication channels.

In a private-key encryption method two parties, a sender and a receiver, agree on a common secret-key which allows them to subsequently encrypt and decrypt communication sent between them. Only those parties who have access to the secret-key, can decrypt encrypted communication. Well known examples are DES and RC5.

In a public-key encryption method each user A has a pair of keys (public-key, secret-key). The public-key is advertised publicly, and knowledge of this key enables user B to encrypt secret communication intended for A. Knowledge of the secret-key enables A to decrypt encrypted information intended for A. Only those parties who have access to the secret-key should be able to decrypt encrypted messages. A well known example is RSA.

In a key-exchange protocol users A and B establish a private-key cryptosystem over the public communication channels. Namely, A and B agree on a common secret-key, by sending each other messages remotely. Again, no eavesdropper to the protocol, should be able to deduce the secret-key established. A well known example is the Diffie-Hellman key exchange protocol.

Assuring privacy of communication and data storage using encryption is becoming common place with the widespread use of the internet for exchanging documents and for access to remote storage.

The wide spread use of encryption poses a problem when there exists an authority, such as a government or business employer, who under some predetermined set of circumstances, should be able to obtain access to information and communication of selected users. For example, currently, it is possible for a law enforcement agency to wiretap phone communications, if it obtains a proper court order. To ensure the ability of an authority to wiretap, it is necessary to provide a mechanism by which the relevant authority can gain access to secret information, without compromising the security of the encrypted information with respect to any unauthorized party. Several technical solutions trying to address this problem of privacy of individual versus concerns of authorities have been proposed. For concreteness we refer to the government as the authority in, question.

There have been several prior efforts at solving this problem.

One approach is known as weak encryption. In this case, the encryption to be used by individuals will be such that the authority can break it (i.e., cryptanalyze). This can be achieved by the government enforcing the use of short size secret-keys, which the government can discover by exhaustive search. The problem with this approach is that not only the government, but any eavesdropper can discover the key by exhaustive search.

Another approach is Full Key Escrow. In this case, the user's secret key is escrowed with the government or some agency that the government trusts, either at the time the cryptosystem is set-up or at the time of transmission of secret communications (i.e., escrow session keys). The problem with this approach is that the individual must trust the government not to use the escrowed secret key unless it is warranted by a court order. This has been proposed by Beth and Denning.

A third approach is known as Split-Key Escrow. In this case, the secret-key of the user is split into n pieces so that an individual piece is of no value in reconstructing the secret-key, but t pieces are enough to reconstruct the secret key (where t and n are parameters of the system). The pieces of the secret are each escrowed with separate trustees of the government. In case of a court order allowing wiretapping (and only in such case), the trustees should hand over to the government their pieces, in which event the government will be able to reconstruct the individual's secret-key and wiretap. This idea has been suggested in several forms. The Clipper Chip is an example of split-key escrow of private-key encryption algorithm, whereas the Fair Cryptosystem of Micali is an example of split-key escrow for public-key encryption algorithms. Different proposals have suggested different methods of how to choose secret-keys and how to split them into pieces. Some times this process is performed by a government approved agency (e.g., Clipper), the individual itself (e.g., Fair Cryptosystems), or by the government and the individual in corporation via an interactive process (e.g., Kilian and Leighton) [KiLe]. In the latter two cases, it has been shown, how the escrowing of pieces can be done verifiably—i.e., the trusted parties may be able to verify that indeed they received a piece of the secret-key without revealing their pieces to each other. We recall that the issue of verifiability for secret sharing was raised by Chor, Goldwasser, Micali and Awerbach [CHMA], who introduced Verifiable Secret Sharing (VSS).

Several objections, both on the social and on the technical fronts, have been raised to these approaches. Also many enhancements and variations have been considered. We refer the reader in particular to [Den, DeSm, Blz, BKOSW, Des, KiLe, FrYu, LWY, MiSi].

To summarize, the main objection to the key escrow proposal is that the individual's privacy relies entirely on trusting the government and law enforcement agencies to follow the rules. If the government does not follow the rules, then it can read everyone's mail. In particular, even if the government is trustworthy today, it may be replaced by an un-trustworthy government tomorrow which could immediately and suddenly recover the secret keys of all users. The obvious fix to this problem is to choose new keys when the new government comes into place. This unfortunately is not workable, as once a system and the rules governing it are in place it would be complex and time consuming to replace, especially as the new government would have no interest in changing the keys. Moreover, if past conversations are stored in memory, the new government may have access to past communications encrypted using old secret keys, even if new keys were used to encrypt new communications.

A. Shamir, in a private communication made at the Crypto 95 conference in August 1995, proposed to use a private key encryption system such as DES with a key of length 256 bits, for which all but 48 of the bits would be escrowed with the government in a split-key fashion. To recover the secret key of an individual, the government would need to first obtain the escrowed bits of the secret-key, and then exhaustively search for the remaining 48 unescrowed bits of the key. This will take at most $2_{48}$ steps, which with today's technology would allow the government to recover the secret-keys of selected individuals, but not to suddenly and simultaneously embark on massive wiretapping. This system can be referred to as partial private key escrow.

SUMMARY OF THE INVENTION

In general, the invention features methods for designing encryption algorithms with different levels of security for different parties: "easier" (but requiring some work nonetheless) to break for some parties (e.g., the government) than for other parties (the adversaries at large). This is achieved by a new form of key escrow in which the government gets some information related to the secret keys of individuals but not the secret keys themselves. The information given to the government enables it to decrypt with a predetermined level of computational difficulty less than that for adversaries at large. Our novel key escrow methods are verifiable. Verification information can be provided to the government so that it can verify that the information escrowed is sufficient to enable it to decrypt with the predetermined level of computational difficulty. The fact that the government must perform some computation to break the encryption schemes of individual users provides a serious deterrent against massive wiretapping.

In a first aspect, which can be referred to as partial public key escrow, the invention features a method of providing different levels of computational difficulty for recovering a public-key encrypted communication, so that a first entity (e.g., the government) experiences less computational difficulty than other entities (e.g., adversaries at large). The method includes the steps of: encrypting the communication using a public key for which there exists a secret key, so that with possession of the secret key the encrypted communication can be recovered without computational difficulty; providing the first entity with first information about the secret key; the first information being less than a full description of the secret key but enough information that the encrypted communication can be recovered with a predetermined level of computational difficulty less than that for the other entities.

In a second aspect, which can be referred to as encapsulated key escrow, the invention features a method of providing different levels of computational difficulty for recovering an encrypted communication, so that a first entity experiences less computational difficulty than other entities, the method comprising the steps of: encrypting the communication so that an entity in possession of a secret key can recover the encrypted communication without computational difficulty; providing the first entity with first information about the secret key, the first information comprising weakly-encrypted information about the secret key; the weakly encrypted information being enough information that the encrypted communications can be recovered with a predetermined level of computational difficulty less than that for the other entities.

In a third aspect, which can be referred to as verifiable partial key escrow (VPKE), the invention features a method of providing different levels of computational difficulty for recovering an encrypted communication, so that a first entity experiences less computational difficulty than other entities, the method includes the steps of: encrypting the communication so that an entity in possession of a secret key can recover the encrypted communication without computational difficulty; providing the first entity with first information about the secret key; the first information being less than a full description of the secret key but enough information that the encrypted communication can be recovered with a predetermined level of computational difficulty less than that for the other entities; providing the first entity with verification information with which the first entity can verify that the first information provided is sufficient for recovery to be achieved within the predetermined level of computational difficulty.

In preferred embodiments, the encrypted information is divided into a plurality of portions separately escrowed with different trustees of the first entity. The first entity is the government and the trustees are obligated under certain conditions to disclose the escrowed portions to the government, whereby the government can monitor the encrypted communications. At least a predetermined number of the escrowed portions must be combined to achieve recovery within the predetermined level of computational difficulty. The computational difficulty required to recover the encrypted communication decreases with increasing numbers of escrowed portions combined to achieve recovery.

In preferred embodiments of the encapsulated key escrow method, substantially the entire secret key is weakly encrypted to form the weakly encrypted information. The weakly encrypted information is divided into a plurality of portions separately escrowed with different trustees. The computational difficulty incurred in recovering the encrypted communication results from the need to decrypt the weakly encrypted information about the secret key.

In preferred embodiments of the verifiable partial key escrow method, the first information (e.g., a portion of the secret key) provided to the first entity comprises information about a disclosed portion of the secret key, and there remains an undisclosed portion of the secret key. The disclosed portion is divided into a plurality of portions separately escrowed with different trustees. The verification information is used to verify the size of the undisclosed portion and that the disclosed portion is a part of the secret key. The disclosed portion may comprise some of the bits of the secret key, and the verification information may be used to verify that the number of undisclosed bits is small enough to permit recovery to be within the predetermined level of computational difficulty, and that the disclosed bits are part of the secret key. The first entity must gain possession of a predetermined minimum number of the escrowed portions before the undisclosed portion of the secret key can be recovered within the predetermined level of computational difficulty.

The secret key may be refreshed without re-escrow of the disclosed portion of the secret key. Changing the secret key increases the size of the undisclosed portion, but does not require a new escrowing of the disclosed portion or a new verification. The commitment to the disclosed and undisclosed portions of the key do not make possible computing the undisclosed portion prior to obtaining a sufficient number of the plurality of pieces of the disclosed portion escrowed with the trustees. The commitment to the disclosed and undisclosed portions are information theoretic and do not disclose any information about the other.

Our invention is an improvement over Shamir's Crypto 95 suggestion. With Shamir's approach, the government cannot verify that the bits it received are indeed the partial bits of the individual's secret key. Second, for partial-key escrow to be workable, it should be the case that the fastest way to recover the 48 unescrowed bits of the secret-key is essentially exhaustive search, otherwise it will not provide protection against massive wiretapping. There is, however, no theoretical basis to believe for a generic private-key cryptosystem that this is the case. It is possible that a cryptosystem whose security is scaled down in this manner becomes quite weak and easy to break. Third, the numbers of 256 and 48 are relevant to today's technology, but are unlikely to be relevant in years to come. A system whose security can be refreshed periodically is desirable, especially without having to escrow new information. Fourth, when decomposing the key into two distinct parts—the escrowed and unescrowed parts—one should take great care, not to make it possible for the government to embark on finding out the 48 unescrowed bits of a given secret-key, before finding out the escrowed portion of the secret-key (an attack which we refer to as the early recovery attack).

The partial key escrow methods of our invention have many advantages, including verifiability, delayed recovery, refreshability, and escrowing over insecure channels.

Verifiability: The trustees can verify at escrow time that indeed they hold in their possession a piece of a portion of the secret key, and that the remaining portion is of a predetermined size. Our verifiability methods are applicable to both public-key and private-key encryption.

Delayed Recovery: Our methods are provably secure against early recovery attack. Early recovery is the danger that by decomposing the key into two parts, one enables the cryptanalytic attack of recovering each part of the key separately and independently. This can allow the government to recover the unescrowed portion of the key even before obtaining the pieces escrowed with the trustees, and thus in effect offer no advantage over standard key-escrow schemes. We point out that some proposals [Mi2] for verifiable partial key escrow do suffer from the early recovery problem.

Refreshable: Our methods allow to periodically refresh the secret key so that the portion of the old secret key which has been partially escrowed, is still a portion of the new secret key. Thus, there is no need to escrow more information, and yet the difficulty of recovering the entire new secret key is periodically refreshed as is the difficulty of the government to wiretap.

Escrow over Insecure Channels: In one of the embodiments of our verifiable partial-key escrow for RSA, escrowing of the pieces of the secret-key can be done over the public insecure communication channels (without use of encryption to hide pieces) via an interactive process between the trustee and the user.

The encapsulated key escrow methods of our invention also have several advantages. In a simple form, these methods allow the user to encrypt his secret key using an independent weak-encryption algorithm which is possible to break for the government in a feasible but not negligible amount of time, and then to escrow the resulting weak encryption of the secret-key with the government. Now, the government still needs to spend time to decrypt it to recover the user's secret key. Alternatively, the weak encryption of the secret key is split into pieces and each piece is escrowed with a separate trustee. When the trustees give the government their pieces, the government can reconstruct the weak encryption of the secret key. The advantages of encapsulated key escrow include:

Delayed Recovery: Since the cyphertext is split into pieces using an information theoretic secret sharing method, early recovery is information theoretically impossible—as it is impossible to cryptanalyze a cyphertext about which you have no information.

Verifiability: The trustees can verify at escrow time that indeed they hold in their possession pieces of an encryption of the legal secret key, and that this is a weak encryption which can be breakable in feasible time if sufficient number of trustees revealed their pieces.

Guaranteed security against massive wiretapping. Since the secret-key is encrypted with an independent encryption algorithm with a pre-determined weak security, we are guaranteed that the government will have to work a pre-specified amount of work, before it can wiretap. In contrast, in Shamir's partial key escrow (see background section), enabling wiretapping by the government is achieved by allowing the government access to part of the secret-key of the user. This access may enable the government to recover the remaining unescrowed portion faster than by exhaustive search.

Safe Storage of Escrowed Pieces: The physical security of the escrowed information, in any key-escrow system is highly important. In the current proposal, the secret-key itself is never escrowed. Rather a weak-encryption of the secret-key is escrowed, and the key to the weak-encryption algorithm is not kept anywhere. Thus, even if an adversary can break into the data base of escrowed information of a trustee, he can still not embark on large scale wiretapping, as he has to decrypt the escrowed information first.

Independence of Secret-Key Structure: The method, in contrast with partial-key-escrow does not depend on any structure or property of the key.

Other features and advantages of the invention will be apparent from the following description of preferred embodiments, and from the claims.

BRIEF DESCRIPTION OF THE DRAWINGS

FIG. 1 is a diagram of a preferred embodiment of a partial key escrow scheme for the Diffie-Hellman cryptosystem.

FIG. 3 is a diagram of the general protocol for an encapsulated key escrow scheme.

FIG. 4 is a diagram of the general protocol applied to RSA cryptosystem.

DESCRIPTION OF THE PREFERRED EMBODIMENTS

Figure 2:
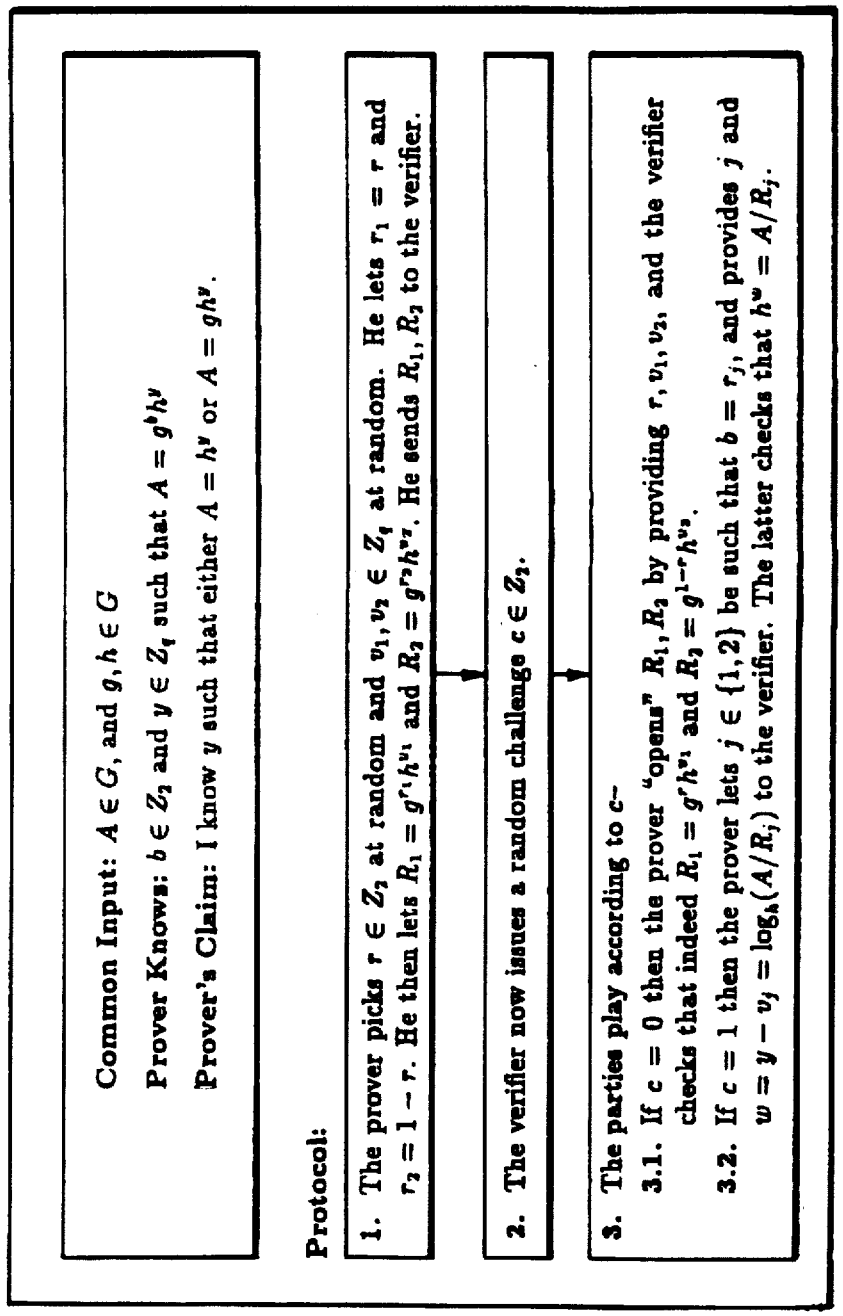
FIG. 2 is a diagram of the proof of knowledge of de-commitment for a verifiable partial key escrow technique.

For simplicity we describe as a preferred embodiment a split key escrow for public key cryptography, but the invention applies also to other cryptosystems, e.g. full key escrow and private key cryptography. In public key cryptography the user will be choosing public key P and matching private key S. For simplicity we ignore the subliminal channels risks that this raises, since this is easily fixed by having the keys chosen by the user and government together |KiLe|.

First, we address a number of issues, whose correct technical resolution is important to having an effective partial key escrow system, and examine approaches to partial key-escrow in this light. Second, we provide concrete, practical partial key escrow embodiments (addressing in particular the issues we raise) for the two most popular existing cryptosystem, namely Diffie-Hellman and RSA. One of our preferred embodiments for RSA has some extra novel features, such as the ability to transfer the pieces of the secret to the trustees over the public insecure channels, and gradual disclosure of the secret as more and more trustees combine.

Verifiability. The partial escrow scheme will specify how an honest user is to compute, and escrow, some information x knowing which one can recover the user secret key S in $2^{48}$ time (for the purpose of this section we will speak of the concrete number $2^{48}$ steps, although clearly this number will change as more computing power is available and should be treated as a parameter which stands for what is considered to be feasible and yet non-negligible amount of time). But there is the concern that the user will cheat, and escrow garbage, or some string x' given which it takes, say, $2^{100}$ steps, rather than $2^{48}$ steps, to recover S. Thus we propose to make the process verifiable. In our schemes, it will be possible for the trustees to check that the user really chose x correctly, and that they have received shares of this x, so that they are ensured that when they recover x they can get S in at most $2^{48}$ steps.

There is a new difficulty here, in addition to previous standard key-escrow methods. The partiality of the escrow must be verified too. Namely, it should be possible to check that the secret key can be reconstructed in the claimed amount of time, if the trustees reveal their pieces of the public key. We design a novel and efficient protocol for the user to prove to the governement that an unrevealed secret (which has been committed tro) is of prespecified size.

Early versus delayed recovery. The main technical difficulty in implementing verifiable partial key escrow is in controlling when can the government do the $2^{48}$ extra computation steps. We note a subtle point here. In some schemes (the obvious ones which come to mind) it is possible to perform this work as soon as the user's public key is made available, and, in particular, without knowledge of the escrowed component x. That is, the extra work thought it exists, can be done, in advance; then when the court order arrives to un-escrow x, the key S is straightaway available. We call this early recovery. We suggest that although schemes having early recovery do provide some kind of deterrent, they are not much better than standard (not providing partiality) escrow schemes. What we need are schemes which have delayed recovery. Here the user is guaranteed that even after the trustees un-escrow x, they must work $2^{48}$ time to recover S—they cannot "jump-start" the process in any way.

Early recovery is best understood via a concrete example, which we give in the next section. We stress, that schemes having early recovery are much easier to design. But they should be avoided, because the promised extra deterrent to the government is in effect not present. Thus, in some ways, it is worse than standard escrow, because the individual is promised some extra security which does not exist. Because of this, if a government endorses a scheme suffering from early recovery it is likely to meet with a hostile public reaction.

A note on timing. Throughout this invention, we are concerned with specifying problems that take a certain amount of time $\tau$ to solve. It should be possible to solve them in this much time, but not in less. We want parameterized problems, in which we can set $\tau = 2^l$ for a security parameter l which thereby controls the "degree of partiality."

An obvious issue here is that CPU speeds vary widely, so what are we measuring? We will not be too formal, but roughly we try to count the number of "basic steps," what these being depending on the problem. For example, in many cases, we view modular mulitplication as a basic step.

A more subtle issue, raised by Rivest, Shamir and Wagner in [RSW], is parallelism. If a problem takes time $\tau$ to solve, it may be possible to solve it in $\tau/2$ time with two processors, etc. Here we view parallelism as a resource too, and don't differentiate between processors and time. Thus when we say a problem takes time $\tau$, we don't rule out that this could be solved by p processors each taking time $\tau/p$. Our assumption is that in estimating the resources of the trustees, we must also estimate the number of processors they have available, and raise our security paremter accordingly. For suggestions for problems in which parallelism won't yield speedups, see [RSW].

A note on efficiency. The most important element in a practical proposal for verifiable partial key escrow is what is the underlying cryptosystem. Of course the escrow and verification protocols must be as efficient as possible, but the cryptosystem will be used repeatedly, while the verification is only at set-up time and is done once. This is why we have worked hard to build schemes in which the underlying cryptosystems are standard ones, namely Diffie-Hellman and RSA. But we stress that our verification protocol, while not blindingly fast, is quite efficient, and certainly far more efficient than what one would get by using zero-knowledge proofs for general NP statements.

Communication channels. In the following protocols, information will be sent between the trustees and the user. Sometimes it can be sent in the clear; other times, it must be encrypted. We assume that private channels are present from user to trustee, and authenticated channels from trustee to user. The former is achieved by encryption under the public key of the trustee, which is assumed universally available. The latter is achieved by signature under the public key of the trustee. Whenever we say that something is sent privately to the trustee(s), we mean it is encrypted with the trustee public key. Henceforth we will just use this terminology of sending privately.

Not all our protocols require private channels; one, for example, that needs no private channels is decribed for the RSA cryptosystem below. The rest need them to some extent.

VPKE scheme for the DH cryptosystem

The Diffie-Hellman cryptosystem [DiHe] is one of the most popular and convenient ones, and in particular lends itself quite naturally to standard split key escrow [Mi1]. Thus it is a natural starting point to implement the idea of partiality.

Let us recall what is the DH system, and what is the standard fair DH system of [Mi1]. Then let us see how we might first try to provide partiality. This will enable us to illustrate the early recovery problem. In the next section we will present our solution for DH.

The DH system. Recall that in the Diffie-Hellman cryptosystem-system, a user A will have public key $g^{S_A}$ and secret key $S_A$, where g is a generator of the group $Z_p^*$ for some large prime p. Secure communication between two users is enabled via the Diffie-Hellman property—another user B, having public key $g^{S_B}$ and private key $S_B$, shares implicitly with A the Diffie-Hellman key $g^{S_A S_B}$ mod p, and can use this shared key to send messages privately, or to derive a session key to this end, as desired. This properties make the system very convenient to use, so that it is amongst the foremost choices of public key systems.

The fair DH system. In Micali's fair Diffie-Hellman cryptosystem-system [Mi1], the user, having published $g^S$, escrows S by simply sharing it via the verifiable secret sharing (VSS) scheme of Feldman and Pederson [Fel, Pe1]. (The scheme of [Fel, Pe1] is attractive because it is efficient and non-interactive.) The verifiability is in the fact that the trustees are able to check that they really have pieces of S, meaning that if later they try to recover the shared secret, they will really get the secret key S of the user, and not some garbage. (A feature of this VSS we stress is that it requires that g raised to the power the secret, here S, be published. We will see the relevance later.) Of course, there is yet no partiality in the key escrow; that is the problem we propose to address.

A possible partial key escrow scheme. A natural suggestion (and the first thing we thought of) is to make the public key have the form $P=g^{x+\alpha}$ where x is long but $\alpha$ is only, say, 80 bits. Now one can escrow x as before, via the VSS of [Fel, Pe1]. (This requires publishing $g^x$. It is important to note that this means that $g^\alpha=P/g^x$ also automatically becomes known.) Then one could try, somehow, to provide a ZK proof that $\alpha$ is indeed only 80 bits long. By Shank's baby-step giant-step method, $2^{48}$ computation steps are enough to get $\alpha$ given $g^\alpha$, and no faster algorithm is known. Thus, the suggestion is that partiality is achieved because it takes $2^{48}$ steps to recover a from $g^\alpha$.

A weakness of the above scheme. As mentioned above, the details of the ZK proof in a scheme such as the above do not concern us. The weakness we pin-point is based only on the fact that $g^\alpha$ is made available to the trustees right from the beginning. We suggest that this defeats the purpose of partial key escrow. The reason is that a trustee can work, for time $2^{48}$, and recover $\alpha$, at any time, and in particular before the trustees receive a court order enabling them to recover x. Then, when the trustees do get the court order to recover z, they straightaway have the full secret key x+$\alpha$. That is, after the court order is issued, there is no extra work to be done at all. We call this the problem of early recovery.

In contrast, our view of partial key escrow is that even after the trustees know x, some work must remain to recover the secret key. That is, we suggest one should have delayed recovery, and that this is crucial. Indeed, partial key escrow with early recovery is not much better than standard key escrow, and in some ways worse, because there is a "promise" of extra security to the individual which is in fact not upheld.

Discussion. Let us again emphasize the issue of timing. Certainly, a scheme such as the above provides an extra (ie. over and above normal escrow) deterrent to the trustees: they have to work an extra $2^{48}$ steps for each key they want to recover. The issue is when they can do this. In the above scheme, any trustee can do it as soon as the verification protocol ends and the public key is published, and in particular without the court order enabling recovery of x.

One might suggest that the timing is not important since, to recover, say, hundreds of millions of keys could still take a while. But nobody wants to recover hundreds of millions of keys. A bad government is likely to have in mind some set of "important" users, say 10,000 of them, whose keys it wants. Before it comes to power, it can, via a single compromised trustee, compute the $\alpha$ values for these users, and store them. Upon coming to power, court orders to uncover the x values for these users are issued at once, and now, by tapping into the stored $\alpha$ values, the full secret keys of these users come at once into the bad government's hands.

One might say that a trustee will not compute a beforehand, since, after all, he is trusted. But all trustees are not trusted—that is after all the entire point of split key escrow. Thus it is reasonable to assume one trustee is in cahoots with the opposition and will pre-compute a table of users and their $\alpha$ values.

Surmounting early recovery. One obvious suggestion is to periodically update the public file: the user would pick a new 80 bit value $\alpha'$, publish $g^{\alpha'}$, update his secret key to $S'=x+\alpha'$ and his public key to $g^{S'}$. But the updating would have to be quite frequent, putting a huge burden on the key management center, and defeating the idea of public key cryptography. So this does not sound like a reasonable solution.

Another suggestion is to formulate things as general NP statements and then use tools like [GMW]. In this way it is possible to solve the problem, but at a huge computational cost arising from the cost of formulating the statements as satisfiability instances via Cook's theorem. We want something which is much more efficient. Thus we are looking for a "direct" solution.

Thus we wish to directly design a verifiable, partial key escrow scheme, for the DH system, which "truly" avoids early recovery. A little thought shows that this will not be too easy. Let us see what kinds of technical problems arise.

Let us take the same starting point—the public key is $P=g^{x+\alpha}$ with x large and $\alpha$ small. The key principle is this: it should take $2^{48}$ steps to recover $\alpha$ after x is revealed, but, before that, recovering $\alpha$ should be intractable.

We want to escrow x. But we run straightaway into a problem. The VSS schemes of [Fel, Pe1] require that we publish $g^x$. But then a trustee can recover $g^\alpha=P/g^x$, and early recovery is possible. We conclude that we cannot give $g^x$ to any trustee, let alone $g^\alpha$. However, this is quite a constraint. Not just for using VSS. Note that even if we could somehow escrow x without revealing $g^x$ (and hence $g^\alpha$), we still have to show that $\alpha$ is small. A natural "cut and choose" ZK proof would work by publishing $g^\alpha$, and then having some challenge response protocol. But we cannot use this.

The problem we face is akin to that of "dictionary attacks." What we would like to do is have a scheme in which it is not possible for the trustees to verify a "guess" as to the value of $\alpha$.

We now show how to get around these problems and present a partial key escrow (VPKE) scheme for the Diffie-Hellman cryptosystem which simultaneously achieves verifiability and delayed recovery, while maintaining efficiency.

A VPKE Scheme for DH Achieving Delayed Recovery

What follows uses some technical cryptographic notions which we first explain in non-technical terms.

We make use of the notion of a committal. Think of it like this. One person A has some information $\alpha$ which she is willing to reveal to the other person B at some later date, perhaps in exchange for some money. But she doesn't want to reveal it now, before she gets the money. So she puts it in a safe, locks the safe with a key, and sends the safe to B. Later, B provides the money. Now A provides the key of the safe. B can open it and recover $\alpha$.

In this process, A is "committed" to $\alpha$ once she put the safe in B's hands: since the safe is out of her reach, she cannot change the information inside it. On the other hand, B doesn't know the information content until he gets the key. This is roughly the idea of a "committal" or "commitment scheme." One party "commits" to some information: she puts it in a safe in such a way that she can't later alter it. The other party doesn't see the information, however, until a later "decommitment" stage in which the "key" is sent.

Obviously the quality of the scheme depends on the strength of the safe; if it can be cracked with some effort then, after some time, B can recover the contents even without the key. If it is a very good safe, B has no hope of getting the contents without the key.

In cryptography, such "safes" are built out of mathematical problems. Opening the safe corresponds to solving the problem. We distinguish two kinds of commitments. We say the scheme is computationally secure if it is in principle possible to open the safe without the key, although it would take a lot of time, and can be regarded as computationally infeasible. Such safes are quite good. Even better are so called information theoretic commitment schemes. Here it is impossible for B to open the safe without the key, even if B were able to perform inordinate amounts of computation.

There is a flip side. When the scheme is information theoretic, it is possible in principle for A to effectively alter the contents of the safe. She can do this by building a safe which has two different keys: the contents recovered by Bob depend on which key she later gives him! But it is computationally infeasible for her to make a safe with two such keys. That is, the amount of time she would have to compute to do this is inordinately large.

In the schemes below, the user will be A and the trustees will be B. The user will commit to pieces of her secret key, using an information theoretic committal.

Main ideas. As above, we will let the public key have the form $P=g^{x+\alpha}$ where x is large and $\alpha$ is small. The user keeps the secret key x, $\alpha$. Now we need to escrow x and also verify the structure of the key P. We recall we can publish neither $g^x$ nor $g^\alpha$. Instead, the user commits to them information-theoretically. (The trustees get no information about x, $\alpha$, even if they are computationally unbounded, while the user is committed as long as he cannot compute discrete logarithms.) We can no longer use the VSS schemes of [Fel, Pe1] to escrow x, but, luckily, Pederson, in a later paper [Pe2], had a (different) scheme which achieved information theoretic secure VSS, and is just what we need. Finally, we prove that $\alpha$ is small based on its commitment.

We provide below a preferred instantiation of this approach. Here we use a particular zero-knowledge method to provide the proof of smallness of the small component. However, many other methods will work as well.

We let l be the parameter such that $2^l$ is the desired delay time in the partial recovery. A suggested choice is l=48. Also recall that n is the total number of trustees of which at most t may be bad. Probable choices are n=3 and t=2 or n=5 and t=4.

If a warrant is issued, any subset of t+1 trustees can recover x by running the recovery procedure of the VSS. From x they can compute $g^x$, and hence $g^\alpha = P/g^x$. We choose $\alpha$ to be 2l bits long, so that $\alpha$ can now be recovered in about $2^l$ steps via Shanks baby-step giant-step method.

The correctness of the scheme relies on two assumptions. The first is the usual assumption on the intractability of the discrete logarithm problem in large enough groups. The second is that given $g^\alpha$, the best algorithm to recover $\alpha$ takes about $|\alpha|/2$ steps. Given these assumptions, the scheme is provably secure.

In order to implement the information theoretic secure bit commitments, we will be working over a group G of prime order q. To be concrete, we take G to be a sub-group of $Z_p^*$, where p=2q+1 is prime, so that operations are in fact in $Z_p^*$.

Information theoretic commitment based on discrete log. Let G be the group of prime order q. We let g be a generator of the group G, and h an element of $G-\{1\}$ such that $\log_g(h)$ is unknown to the committer. (Note h is also a generator of G.) The committer can commit to any $z \in Z_q$. He does so by picking $v \in Z_q$ at random and letting the commitment be $Z=g^z h^v$. This value is uniformly distributed over G for each fixed value of z, so that the receiver gets no information about z from the committal. (This commitment scheme is used in [Pe2] and extends schemes used in [BoDa, BCY, BMO] amongst others.)

To decommit a value Z, the committer must provide z, v such that $Z=g^z h^v$. To cheat he must be able to find values $z_1 \neq z_2$ and values $v_1, v_2, Z$ such that $Z=g^{z_1}h^{v_1}=g^{z_2}h^{v_2}$. But the committer cannot cheat in this manner if he doesn't know $\log_g(h)$. For completeness let us see why. Indeed, it is easy to see that the above implies $g^{z_1-z_2}=h^{v_2-v_1}$. But since q is prime, the element $v_2-v_1$ (it is non-zero because $z_1 \neq z_2$ implies $v_1 \neq v_2$) has an inverse $\beta$ in $Z_q$, and raising both sides to the power $\beta$ we get $\log_g(h)=\beta(z_1-z_2)$. (We stress that this argument requires that the order of the group is prime, which is why we chose to work in a group of prime order.)

For any user not knowing $\log_g(h)$, we will, informally, use the notation D(Z) to refer to the "de-committal that the user knows"; namely the value z for which the user also knows v such that $Z=h^z g^v$. We stress that this "notation" is not formally well defined since for any z there exists a v such that $Z=h^z g^v$, but intuitively it is the z that the user "knows", and it is useful to be able to talk about it.

As stated, this scheme can be used to commit to any value $z \in Z_q$. Part of our protocol will use it only to commit to bits $z \in Z_2$. In such a case, we will have to verify that the value committed to is a bit, and not something bigger.

Detailed description of the protocol

Common to all users are parameters p, g, h. For concreteness, let the number p is a prime of length at least 512 bits. We choose p=2q+1 where q is also prime. We can identify, by standard means, a sub-group G of $Z_p^*$ of prime order q, and work over G. (In particular, membership in G is testable, and operations in the following are over G.) Since G has prime order it is cyclic, and moreover any non-trivial member of G is a generator of G. We let $g \in G$ be a randomly chosen generator of G. Finally, h is a random member of $G-\{1\}$ (hence in particular also a generator of G) such that nobody knows $\log_g(h)$, the discrete logarithm of h with respect to g.

Notice that p-1 has a large prime factor, namely q, so the discrete logarithm problem in $Z_p^*$ is hard, as is the discrete log problem in G.

These system wide constants can be chosen a priori by some center and published, as follows. The center chooses p, g with the required properties, and then computes h via hashing of all these quantities under some suitable public one-way hash function such as SHA as follows. The center will first appropriately extend SHA to yield a function H with a 512 bit output. Then it will successively try the values H(p,g,1), H(p,g,2), ... until it finds one which is in $G-\{1\}$. This is our h. The value of j for which H(p,g,j)=h will also be published. We note that we do not have to trust the center: all necessary properties of the numbers can be checked by any user. (The primality of p and q can be tested. To check that g is a generator it is enough to check that $g \in G$ and then, since G has prime order, to check that $g \neq 1$. And finally test that h is indeed appropriately derived from p,g via hashing.) Also note the center is not active; these choices made, it can disappear.

Choice of keys. The user chooses a random number $x \in Z_q$. He also chooses 2l random bits $\alpha_0, \alpha_1, \ldots, \alpha_{2l-1} \in Z_2$, and lets $\alpha = \alpha_0 2^0 + \alpha_1 2^1 + \ldots + \alpha_{2l-1} 2^{2l-1}$. He now sets $S=x+\alpha$ mod q. This will be his private key. The public key is $P=g^S$. (Here x is the large component of the secret key, and will be escrowed, while $\alpha$ is a random 2l bit number which is the small component of the secret key, and will be hidden information-theoretically from the trustees until they recover x, at which point $\alpha$ will be recoverable in $2^l$ steps but not less.)

The protocol must verifiably escrow x and also convince the trustees that $\alpha$ can be recovered in about $2^l$ steps if x is known, all this without revealing any polynomial time predicate on $\alpha$. The steps of the protocol we now discuss are summarized in FIG. 1.

Commitments. The user begins by committing to both components of the keys using the information theoretically secure commitment scheme. The large part x is committed to as a block-namely the user chooses $u \in Z_q$ at random and sets $X=g^x h_u$. The small part is committed to bit by bit—namely for each $i=0, \ldots, 2l-1$, the user picks $u_i \in Z_q$ at random and sets $A_i = g^{u_i} h^{\alpha_i}$. The values $X, A_0, \ldots, A_{2l-1}$ are broadcast to the trustees.

Proof that commitments define the key. Next the user proves that the committed values do indeed define his secret key $x+\alpha$. To understand this step, we note that if the user is honest then it must be that $x=D(X)$ and $\alpha_i=D(A_i)$, $i=0, \ldots, 2l-1$. Thus it must be that $$P = g^{\alpha + \alpha_0 2^0 + \alpha_1 2^1 + \ldots + \alpha_{2l-1} 2^{2l-1}} = (X/h^x) \cdot \prod_{i=0}^{2l-1} (A_i/h^{u_i})^{2^i}.$$

So we have the user provide $w=u+u_0 2^0 + u_1 2^1 + \ldots + u_{2l-1} 2^{2l-1}$ to each trustee. Each trustee now checks that $X \cdot A_0^{2^0} \cdot A_1^{2^1} \ldots A_{2l-1}^{2^{2l-1}} = P \cdot h^w$. (It still remains to convince them that a is small.)

Escrow of large component. The large component x is verifiably secret shared using Pederson's information theoretic secure scheme [Pe2]. The starting value is the commitment X to x. We refer the reader to [Pe2] for how the scheme works. An important feature of the scheme is that $g^x$ is not revealed. We also note that this scheme is as efficient as the earlier ones of [Fe1, Pe1] used in Micali's Fair PKCS [Mi1], and in particular is also non-interactive.

Proof of smallness of small component. The last step of the protocol is to convince the trustees that a is only 21 bits long. For this, it suffices to convince the trustees that each $A_i$ is a committal to a bit, either 0 or 1. (Our concern is that the user would cheat and make $A_i$ of the form $g^z h^y$ for some large $z \in Z_q$.) This last task is accomplished by a proof of knowledge. FIG. 2 represents the atomic proof of knowledge protocol. This protocol will be run with the user in the role of prover and a trustee in the role of verifier. Since the atomic protocol only has knowledge error ½, it must be repeated, say, 100 times, to get the error down to $2^{-100}$. However, this doesn't mean that the protocol must be repeated this often with each trustee—it can be repeated only $\lceil 100/(n-t) \rceil$ times with each trustee, where n is the total number of trustees and t the maximum number of bad ones.

The atomic protocol is perfect zero-knowledge. When repeating the protocol, the parties may of course do so in serial, and preserve the zero-knowledge. But for efficiency parallel repetition is preferable. Although this is not zero-knowledge, we will show it is perfectly witness indistinguishable, a property that suffices for the correctness of the overall VPKE protocol.

The proof of knowledge protocol and its properties are discussed in more detail below.

Key certification. Finally, if all checks pass, the trustees each individually sign the public key P, and it is placed in the public file. This key can then be used for public key cryptography by using the Diffie-Hellman system in the usual way.

Recovery. Now, suppose a warrant issued to t+1 trustees to recover the user key. The trustees need to recover S. They first pool their shares to reconstruct x. This is possible by the property of the VSS. Now note that $g^\alpha = g^{S-x} = P/g^x$, and since the trustees have x, and of course P, they recover $g^\alpha$. But $\alpha$ is 21 bits long. By Shank's baby-step giant-step method, $\alpha$ can be recovered in $2^l$ steps. (This is the best known time.)

The Assumption Informally, the standard DE assumption is augmented to assume that there is no polynomial time algorithm to compute discrete logarithm of $g^b$ mod p, even when b is 'small', (i.e of length 2l).

Correctness. Let us try to give a very informal idea of why the protocol is a verifiable, partial key escrow. First, consider X. The properties of VSS guarantee that after the escrow based on X, the trustees are convinced that there is a unique, well defined de-committal which they can later recover. We can denote it $D(X)$. Now, consider $A_0, \ldots, A_{2l-1}$. For each $i=1, \ldots, 2l-1$, the proof of knowledge of the underlying de-committal of $A_i$ guarantees that the user, if he knows any de-committal of $A_i$, knows one which is a bit, not some large string. We can denote this bit by $D(A_i)$.

The fact that X and $A_0, \ldots, A_{2l-1}$ are really committals means that the user knows only one way to de-commit them, given that he doesn't know $\log_g(h)$. This in turn means that the proof that the commitments define the key can be believed—see the above calculations. So now the trustees know that the key is $D(X) + D(A_0)2^0 + D(A_1)2^1 + \ldots + D(A_{2l-1})2^{2l-1}$. Finally, the proofs of knowledge have convinced the trustees that each $A_i$ hides only a bit so they know $\alpha$ is only 21 bits long.

Why is early recovery of a impossible? Because $\alpha$ is information theoretically hidden. More precisely, for any of the $2^{2l}$ values of $\alpha$, the view of any collection of t trustees would be the same. So they have no idea what a could be. (Of course if t+1 trustees get together they can recover x, and hence know $g^\alpha$.)

Efficiency improvements. The whole protocol can be made non-interactive. (That is, the user sends a single message, after on receipt of which the trustees decide whether or not to certify the key.) The only part that currently is interactive is the proof of knowledge. The interaction can be eliminated by specifying the challenges via a hash of the committals and other information. (See [BeRo] for discussions of the random oracle setting in which this can be modeled, definitions of zero-knowledge in this setting, and discussions of the meaningfulness of instantiating random oracles via hash functions.)

The Proof of knowledge

In the VPKE protocol, $A_i$ is supposed to be a commitment to a bit, namely the i-th bit of $\alpha$. Our conviction that the underlying a is really only 21 bits long, and not something much bigger, comes from the conviction that $A_i$ hides a bit, and not something much bigger. Our fear is that the user would cheat, and commit instead to a string z, by constructing the commitment as $g^z h^y$ for some $z \in Z_q$. So we prove, in the last step of the VPKE protocol, that each $A_i$ really hides a bit. As indicated, we will use the protocol KOD of FIG. 2, with the user as prover, A being the user's commitment, and a trustee being the verifier. This section is concerned with the properties of this proof.

Protocol KOD is inspired by a sub-protocol in the perfect zero-knowledge proof of graph non-isomorphism of [GMW]. We recall that in that protocol, the verifier sends the prover a graph which is isomorphic to one of the two input graphs. The sub-protocol we refer to is used by the verifier to prove to the prover that he "knows" an isomorphism between the graph he supplies and one of the input graphs, without revealing which.

We regard g, h as fixed and consider the predicate $P_{g,h}(A,y)$ which is true if and only if either $A=h^y$ or $A=gh^y$. Here A is the input, or instance, and y is the witness. Notice that for any A there are exactly two, distinct witnesses, namely $\log_h(A)$ and $\log_h(A/g)$. The prover will prove he knows one of them, without revealing which.

We stress that this is a proof of knowledge, not of membership in any language. Indeed, there is no non-trivial language membership problem to consider. The statement $\exists y: P_{g,h}(A,y)$ is true for all A—what we need to do is show the prover knows such a y.

Regarding the security, the property we want is perfect witness indistinguishability. Namely, the view of a verifier is the same regardless of which witness the prover holds [BMO, FeSh]. This is a weaker property than perfect zero-knowledge, but suffices for this application, because it means the verifier cannot tell whether the bit D(A) is 0 or 1.

The object we are really interested in is the m-fold parallel repetition of the atomic protocol of FIG. 2. However, we begin by analyzing the atomic protocol itself.

We use the definition of proofs of knowledge of [BeGr, FeSh], and in particular refer to the notion of "knowledge error" of [BeGr]. We will show that the atomic protocol is a proof of knowledge with knowledge error ½. This means that without knowing a witness, it is possible for a prover to make the verifier accept half the time, but any excess above ½ in the accepting probability translates into witness recovery with probability equal to this excess, via a witness extractor algorithm M which uses the prover as an oracle. We will then be able to invoke composition theorems from [BeGr] to show that the knowledge error is reduced by repetition.

We analyze the atomic protocol to show that it is perfect zero-knowledge. This is more than we need, and implies perfect witness indistinguishability of the composed protocol.

The properties we show the protocol possesses are not dependent on the hardness of the discrete log problem. Our job is to show that the prover knows how to de-commit a given blob as either a 0 or a 1. The hardness of the discrete log then implies he cannot de-commit it as any other quantity, which is important to the correctness of the VPKE. But for the proof of knowledge we don't care about this.

Lemma 1: The protocol KOD of FIG. 2 is a perfect zero-knowledge proof of knowledge, with knowledge error ½, for the predicate $P_{g,h}(A,y) \leftarrow \rightarrow (A=h^y) \vee (A=gh^y)$.

Lemma 2: Let $KOD_m$ denote m-fold parallel repetition of protocol KOD of FIG. 2. Then $KOD_m$ is a proof of knowledge with knowledge error $2^{-m}$ for the predicate $P_{g,h}(A,y) \leftarrow \rightarrow (A=g^y) \vee (A=hg^y)$.

Furthermore $KOD_m$ is perfectly witness indistinguishable.

An efficiency improvement. It is possible to significantly improve the efficiency of protocol $KOD_m$, by an improved protocol, derived from Cramer, Damgård and Schoenmakers [CDS]. This protocol uses only three rounds to get a very low error. (That is, the protocol does not consist of repetitions of some atomic protocol. It directly gets low error.) In each round the prover needs two exponentiations and the verifier needs four. As with $KOD_m$, it is perfectly witness indistinguishable. (Recall that the VPKE protocol in FIG. 1 invokes $KOD_m$ with m=100/(n–t) for each $A_i$. Now we invoke the new protocol on each $A_i$, at reduced cost, and with no repetitions.)

A VPKE scheme based on Factoring

There are many suggestions for public-key encryption schemes based on the difficulty of factoring integers, e.g [RSA, BlGo, BeRo]. It is thus desirable to implement an efficient verifiable partial key escrow protocol, for any factoring based cryptosystem.

In this section, we present some simple schemes exhibiting some novel extra features. One is that all communication between the user and the government trustees during the escrow protocol can take place over the public channel, with no need for encryption. This may be good from the export control point of view. Another feature is that there is no sharp threshold of recovery, but rather a gradual release. Very few trustees cannot get the secret key, and lots of them can; in between, as more and more trustees get together, the work to get the key decreases as the number of trustees involved grows. These simple schemes, however, suffer from early recovery.

A VPKE scheme based on factoring: threshold version

As before n is the number of trustees. (Note that n could be 1.) Let $k_1$, $k_2$ be a pair of security parameters. The first parameter, $k_1$, denotes the size of numbers recommended for use in a cryptosystem such as RSA which is based on the difficulty of integer factorization. The second parameter, $k_2$, denotes size of integers which would take a moderate amount of time to factor. (This can be parameterized further by introducing functions small(k), large(k) where small(k) denotes the number of wiretaps per year, and large(k) denotes the total number of individuals. Then we require that the time required to factor small(k) number of integers of size $k_2$ should be moderate, whereas the time required to factor large(k) number of integers of size $k_2$ should be infeasible. For appropriate choices for $k_1$ and $k_2$ given the performance of factoring algorithms today see the article of Odlyzko in CyptoBytes [Od].) The user chooses n different numbers $M_1, \ldots, M_n$ (one per trustee) each product of two large (length $k_1$) primes. This is done in a way which ensures that $J_{Mi}(-1)=1$. (The Jacobi symbol of –1 mod $M_i$ is 1. There are many well-known ways of making sure this is true.) He also chooses a number $N_2$ which is the product of two small (length $k_2$) primes. The user makes $M_1, \ldots, M_n$ and $N_2$ public. Let $N_1$ be the product $M_1 \ldots M_n$ and let the composite number N, of the user, be the product $N_1 N_2$. This modulus is the basis for the cryptosystem, and could be used, for example, for RSA. The prime factors are kept secret, and enable decryption. (When encrypting and decrypting modulo N, computations can be performed individually modulo each of the $M_i$ and modulo $N_2$. The results can then be combined via Chinese remainders. This will be much more efficient than working directly modulo N, and is the reason we made all the numbers $M_1, \ldots, M_n$ public.)

Now we describe how to do the verifiable partial escrow. Let the trustees be $T_1, \ldots, T_n$. For each i=1, . . . , n, the user and trustee $T_i$ engage in the following protocol;

The trustee checks that indeed $N=N_1 N_2$, and that the size of $N_2$ is $2k_2$. He also checks that $J_{Mi}(-1)=1$.

The trustee chooses at random a $y \in Z_{di}^*$ with Jacobi symbol –1, sets $z=y^2$ mod $M_i$, and sends z to the user. The user computes a Jacobi symbol +1 square root w of z modulo $M_i$ (which he can do because he knows the prime factors of $N_1$) and sends w to the trustee. Upon receipt of w, the trustee checks that $w^2=z$ mod $M_i$. He then computes $\gcd(y-w,M_i)$ and thereby factors $M_i$. These factors are his partial share. (Since the result of this is just to transfer the factorization of $M_i$ to $T_i$ one might ask why we do it this way, as opposed to just sending the factors of $M_i$ to $T_i$. The reason is that to do the latter we need a private channel from the user to $T_i$, and we want to avoid encryption.

In case the government receives legal authorization to wiretap and wants to recover the factors of N it does the following. First, it obtains from trustee $T_i$ the factorization of $M_i$, and thereby has the factorization of $N_1$. Then it works to factor $N_2$, which is feasible as the size of the factors is $k_2$. The security is in the fact that t<n trustees cannot factor $N_1$. However, since $N_2$ can be factored at any time, we do have early recovery.

Note that the above scheme besides providing partiality, requires no private communication between trustees and user.

A VPKE scheme based on factoring: gradual disclosure version

The following scheme, in addition to providing partial recovery and no need for private channels between trustee and government, has a novel feature in comparison with known schemes. Namely there is a "gradual" increase in recovery probability as more and more trustees get together. Thus it is not a threshold scheme in the traditional sense of having some sharp threshold; rather as more and more trustees get together, the work factor they must put in to get the full key steadily decreases.

As above, the user's modulus N will be the product of two numbers $N_1$ and $N_2$, where $N_2$ is the product of two small (size $k_2$) primes. However $N_1 = p_1 \cdot p_2 \ldots p_l$ is now the product of l primes, each of length $k_1$ bits. It is chosen so that $J_{N_1}(-1)=1$. Both $N_1$ and $N_2$ are given to the trustees. Again, for each $i=1, \ldots, n$, the the user and trustee $T_i$ engage in a protocol as follows:

First, the trustee checks that indeed $N=N_1 N_2$, and that the size of $N_2$ is $2k_2$. He also checks that $J_{N_1}(-1)=1$.

Second, the trustee chooses at random a $y \in Z_{N_1}^*$ with Jacobi symbol $-1$, sets $z=y^2 \mod N_1$, and sends z to the user. The user computes a Jacobi symbol $+1$ square root w of z modulo $N_1$, and sends w to the trustee. Upon receipt of w, the trustee checks that $w^2 = z \mod N_1$. He then computes $\gcd(y-w, N_1)$ and thereby obtains a split $S_i$ of $N_1$. This split is his partial share.

Note, that even if only the trustee (or similarly, if only the user) acted according to the protocol, then the trustee will have in its hands a random split of $N_1$ (among all possible splits of $N_1$ into integers a,b such that $N_1=ab$.)

When the government wants to wiretap it first factors $N_2$. Then it gives the court order to the trustees who return their splits of $N_1$. Since each share $S_i$ represents a random split of $N_1$, the probability that there exists a pair of primes $p_u, p_v$ ($u \neq v$) such that for all $S_i$ both $p_u, p_v$ divide $S_i$ (or alternatively both divide $N_1/S_i$), is less than $l^2/2^n$. (Eg. to achieve probability of recovery greater than ½ set the number of prime factors l to be say 3, and the number of trustees to be n=5.) The factorization of $N_1$ is obtained by combining the n splits of $N_1$ by repeated greatest common divisor (gcd) computations.

Second, even if t of the trustees cooperate to try to factor $N_1$ by telling each other their shares, before court authorization is obtained, then there will be at least one pair of distinct primes $p_u, p_v$ whose product remains unsplit in all the shares of the t trustees, as long as $l>2^t$.

Suppose we want to make the probability of recovery in the above scheme $1-2^{-60}$. If $l=3$, we will need n=65. That is, the scheme needs a lot of trustees. Here is a way to increase the recovery probability without increasing the number of trustees. Have the user simply repeat the exact same protocol above several times with the same trustee, and the share of the trustee now becomes the set of shares obtained from every execution of the above protocol. If the number of repetitions is m, then the probability of complete recovery is greater than $1-l^2/2^{mn}$. On the other hand we must also have $l>2^{tm}+1$ to guarantee security against t trustees.

Finally, the entire procedure of disclosing the partial key $N_1$ is done over the public network. (For authenticity it is expected that everybody knows a public key of each trustee under which trustees sign the messages they send. But we require no additional public key cryptography, and in particular no encryption. This is good for export control.) As long as the trustees verify their computation as specified above (even in the presence of bad t trustees when $l>2^t$), the partial disclosure of keys has been fully verified.

A drawback of the schemes in this subsection is that early recovery is possible. Namely, as soon as $N_1$ and $N_2$ are published, the government can start working on factoring $N_2$—a task which takes non-negligible time but is feasible. Thus, in the interim before the government ever gets the escrowed shares of the factorization of $N_1$, it can spend all its time factoring $N_2$ for all users in existence.

Refreshing Keys: A simple solution to this problem (although not very elegant) is refreshing secret keys without having to escrow again any new information as follows. Set $N_2^0 = N_2$, and at fixed time intervals i reset $N=N/N_2^{i-1} \cdot N_2^i$ where $N_2^i$ is a freshly chosen composite number which is a product of two prime factors of size $k_2$ bits each. Again, A knows the prime factors, but the government does not. The security of past messages does not change.

Another drawback is that the numbers defining the cryptosystem are large, making public key operations slow.

Both these drawbacks will be addressed by the schemes we provide below. Besides achieving delayed recovery, the scheme we present there enabled a user to escrow the factors of a given RSA modulus, say one product of two primes. That is, unlike the above schemes, we will not have to use large modulii which contain more than two primes. In other words the underlying cryptosystem can be the standard RSA one. In particular, encryption and decryption will as efficient as standard RSA.

Encapsulated key escrow

We put forth a new paradigm for designing a cryptosystem with different levels of security for different potential adversaries. This paradigm is more flexible and more general than the partial key escrow paradigm. Our method enables the key of any cryptosystem to be escrowed in such a way that $2^{48}$ (or some other prescribed number) of steps are necessary to recover it. The method does not depend on any structure or property of the key. It applies to any of the popular existing public key cryptosystems, including RSA and Diffie-Hellman. It also applies to any private key cryptosystem. Furthermore, the method extends to guarantee verifiability.

This is achieved in quite a different way from dividing the key into two portions, as follows.

Take any public-key cryptosystem with public information P and secret information S. Have the user choose a secret key K of "small enough" length (eg. 48 bits) so it is recoverable by the government by exhaustive search, and escrow the value C (either entirely or in a split fashion) where $C=E_K(S)$ where E is an algorithm having the property that finding S given $E_K(S)$ takes some pre-determined amount of time, such as $2^{48}$ steps. (Possible choices of E are discussed below.) Now the governments task for recovering S is reduced to finding K, whereas all other adversaries have only P at their disposal.

This idea applies to private-key cryptography as well as to public-key cryptography.

The function E could be anything that has the property that finding S given $E_K(S)$ takes some pre-determined amount of time $2^{k_2}$. For example, a good private key encryption algorithm such as RC5 with a key of $k_2$ bits. But there are many other possibilities. E could be defined via a number theoretic problem, like factoring a not too big number (large enough that the best factoring algorithm takes about $2^{k_2}$ time). Or E could be defined via the discrete logarithm problem. Finally, E could be the squaring based time-lock puzzle of [RSW]: here the advantage is that finding S given $E_K(S)$ takes $2^{k_2}$ sequential steps; even parallelism won't help speed up the process.

We stress the novelty and generality of this paradigm. First, it is not based on splitting a key into two parts. Second, it can use any function E to control the time for which the trustees have to work; previous solutions have used a particular function. Third, it works for any cryptosystem: private or public key, and for any particular system in either category. Finally, it is very efficient and simple.

Adding verifiability

The above outline does not include verifiability. We now show how to achieve verifiability for any cryptosystem defined by a claw-free pair of permutations [GMRi]. (They do not have to be trapdoor, and actually an even weaker condition than claw-free permutations suffices. See below.

In particular, an implementation of such claw-free permutations can be made based on the discrete log problem, which yields a second escrow method for the DH system. (The first was presented above and used information theoretic bit committment and the idea of breaking the secret key into a small and big part.) A second implementation of claw-free permutations can be made based on the factoring problem, which yields a second escrow method for the RSA system. See below.

The general transformation

Let us now briefly discuss how the generalized protocol goes. Here we will give a quick and informal description suited more to a reader familiar with our previous work and knowledgeable about the area. Below we provide a less technical exposition for the benefit of a reader not so familiar with cryptographic lore and techniques.

Assume that we have a cryptosystem with the following properties. Let sk be the secret key and pk the public key of the user. Then there are functions $f_0: D_0 \rightarrow D$ and $f_1: D_1 \rightarrow D$, for some domains $D_0, D_1, D$, such that if one has a claw—ie. a pair $(x_0, x_1) \in D_0 \times D_1$ for which $f_0(x_0) = f_1(x_1)$—then one can find sk. Furthermore, given sk it is possible to generate claws. (In the factoring scheme, $D_0 = Z_N^{+1}$ and $D_1 = Z_N^{-1}$ and $f_0(x) = x^2 \mod N$ and $f_1(x) = x^2 \mod N$.)

The protocol is in FIG. 3. It consists of repeating an atomic protocol m times. The atomic protocol is as follows.

The user (having sk,pk) picks $(x,y,s) \in D_0 \times D_1 \times D$ such that $f_0(x) = f_1(y) = s$. Then the user picks a $k_2$-bit key K and lets $C = E_K(x)$. It sends s to the trustees. Then it picks a random degree t polynomial $f$ with constant term C, and sends the shares of $f$ to the trustees as before. The trustees challenge the user with a random bit c. If c=0 the user sends y to the trustees and they check that $f_1(y) = s$. If c=1 the user sends the coefficients of $f$, and K, to the trustees. They check that their shares were correct and that $|K| = k_2$. Then they compute $E_K^{-1}(C)$ and call this x. They then check that $f_0(x) = s$.

To recover sk the trustees would first pool their shares to reconstruct the polynomials, which with high probability would get them y,C such (x,y) is a claw, where $x = E_K^{-1}(C)$. Then they would search for K to find x, and then use the claw to find sk.

An encapsulated key escrow scheme for Diffie-Hellman cryptosystem

We now apply the above to derive a new scheme for escrow of a Diffie-Hellman key. This supplements our previous solutions to this problem.

Let the DH public key of the user be $P = g^S$, where S is the user's secret key and g is a generator of the underlying group G. (We work over a group G which, unlike in our previous scheme, need not be of prime order, but could be if one liked. We continue to denote this order by q, but now it need not be prime. In particular we could have q=p−1 where $G = Z_p^*$ for prime p.) Define $f_0: Z_q \rightarrow G$ by $f_0(x) = g^x$ and $f_1: Z_q \rightarrow G$ by $f_{1(y)} = P \cdot g^y$. Notice that if (x,y) is a claw then $f_0(x) = f_1(y)$, or $g^x = P \cdot g^y$ and hence $\log_g(P) = x - y$. That is, we can recover S from (x, y). Furthermore it is easy to construct claws given S: just pick x at random and let $y = x - S \mod q$. So we can apply the above general construction to get a verifiable encapsulated key escrow system.

Notice that this system does not use the idea of S having a small and large component, and does not rely on the assumption that computing α from $g^\alpha$ requires $2^{|\alpha|/2}$ steps. The time delay that the governement experiences in retreiving the key is arising from an entirely different source, namely the symmetric key K which hides one half of the claw in our protocol. Furthermore, as we have noted before, any time lock problem could be used for this purposse.

An encapsulated key escrow scheme for RSA and Factoring Based Schemes

In this section we describe ways for users to achieve verifiable escrow of weak-encryption of the factors of a given composite number. The composite number can be used as a public key in the RSA system. This supplements our previous solutions to this problem.

Besides achieving delayed recovery, the scheme we now present will enable a user to escrow the factors of a given RSA modulus, say one product of two primes. That is, unlike the above schemes, we will not have to use large modulii which contain more than two primes. In other words the underlying cryptosystem can be the standard RSA one. In particular, encryption and decryption will as efficient as standard RSA.

Our scheme achieves delayed recovery, and yet is quite efficient. Moreover, it can use any problem to provide the time bounded delay.

The Description of protoco is as follows.

The user chooses his modulus N=pq. The user and trustees then follow the protocol described in FIG. 4. We will not re-explain it here; let us just give some intuition and comment on some parts.

First, some notation. Recall that $J_N(\cdot)$ is the Jacobi symbol. We let $Z_N^{+1} \subseteq Z_N^*$ be the Jacobi symbol +1 elements, and $Z_N^{-1} \subseteq Z_N^*$ the Jacobi symbol −1 elements.

The idea and some explanations. Consider the following protocol. The user chooses a random square $s \in Z_N^*$ and lets x,y be square roots of s with Jacobi symbols +1 and −1 respectively. He picks a random $k_2$ bit key K and enciphers x to obtain $C = E_K(Z)$. He gives s to the trustees. He also escrows C by ordinary secret sharing—he lets C be the constant term of a otherwise random polynomial $f$ of degree t, and sends $f(j)$ to trustee j for j=1, ..., n. Now, we know that given x and y the trustees could factor N. What the user can do is give them y up-front. After recovery, they have C, and thus, in $2^t$ time, they have x and can now factor.

However, the above is not verifiable. To make it verifiable, we run the above many times and do a cut and choose. Each time, the trustees get to see either y, and check it is a Jacobi symbol −1 square root of s; or they get $f$ and K and can check that the escrowed C was really an encryption, under a $k_2$ bit key K, of a Jacobi symbol +1 square root x of s. This convinces them that in most iterations both properties are true, which means they are convinced they could recover the key in about the amount of time they would like. (See below for details on recovery.)

How is the challenge c in the protocol of FIG. 4 issued? Probably the easiest is to have each trustee issue about 100/(n−t) challenges. Thus at least 100 challenges are made by honest trustees, and are random.

Notice that the elements of the protocol are quite simple and efficient. For example, we don't need any VSS; we use plain secret sharing. We also don't need any information theoretic committals. (Step 2 needs no committals at all. The coin flipping in the well for Step 1 can use any ordinary committal scheme.)

In discussing the protocol, we will subscript the quantities by an index i ($1 \leq i \leq m$) which indicates the iteration.

Recovery. Let I={i ∈ |m|:$c_i$=0}. For each i ∈ I consider the following recovery procedure Recover(i). The trustees use their shares of $f_i$ to recover $f_i$. This gives them a ciphertext $C_i$. They now run the $2^t$ time recovery procedure to get $x_i$ from $C_i$, and check that $x_i^2=s_i$ mod N. They already have $y_i$ (because $c_i=0$) so they can now compute $\gcd(x_i-y_i, N)$, which is a non-trival factor of N. So they can factor N.

However, the above will not work for all $i \in I$—what we will be guaranteed, from the verifiable escrow procedure, is that it will work for most $i \in I$. So, the trustees pick a random $i \in I$ and run Recover(i). If it doesn't work, they pick another random i and try again. They may have to do this a few times, but not too often. Specifically, with the parameters as we have set them, it is possible to show that the probability that the trustees have to run the procedure twice is at most 0.02, and the probability that they have to run it three times is at most 0.006. (So 98% of the time it takes $2^t$ time to factor N; however 2% of the time it may take $2^{t+1}$ time, etc.) Thus for all practical purposes, the recovery procedure is run just once, so the trustees compute for essentially $2^t$ time.

Security for the user

Why is early recovery not possible? This follows from the security of the secret sharing. To any subset of the trustess of size at most t, the ciphertext C is information-theoretically hidden. So they have no information about C whatsoever. (They have some information about x because they know it is the square root of s, but computing square roots modulo N is intractable. Furthermore, the following says the protocol leaks no additional information about the factors of N, and hence about x.)

We now need to argue that the user does not leak any information about the factors of N. We consider only Step 2, since Step 1 is by definition zero-knowledge. We claim that the protocol is statistical zero-knowledge to any subset of t trustees. (In contrast the ZK in Step 1 is only computational.) That is, fix any subset S of t (possibly cheating) trustees. We will show how to compute a simulation of their joint view.

The simulator has input N, and black-box access to the trustees. It picks a random $y \in Z_N^{-1}$ and a random $x \in Z_N^{+1}$. It picks a bit d at random. If d=0 it lets $s=y^2$ mod N, else it lets $s=x^2$ mod N. It picks a random $k_2$ bit key K and lets $C=E_K(x)$. It picks $\alpha_1, \ldots, \alpha_t \in Z_N^*$ at random and lets $f(x)=C+\alpha_1 x+\ldots+\alpha_t x^t$. It now gives the trustees s, and also gives trustee i the share $f(\alpha_i)$. In response the trustees return a bit c. (Chosen, perhaps, by the bad set whose view we are trying to simulate, perhaps by some other trustee.) If c=d then the simulator can continue the simulation. (If d=0 he returns y. Else if d=1 he returns K,C,$\alpha_1, \ldots, \alpha_t$) Else he backs up and tries again. Thus if he tries i times he can output a simulation with probability $1-2^i$.

More on problems to use for Encapsulation

Suppose that for some reason we wanted, as a source of the 'encapsulation," a problem directly related to factoring N rather than the private key cipher based problem above. Here is a possible approach that could be incorporated into our scheme.

Let N=pq be an RSA modulus product of two (k/2)-bit primes p and q. Let $y \in Z_N^{-1}$ be chosen at random, and let $s=y^2$ mod N. Let $x \in Z_N^{+1}$ be a Jacobi symbol +1 square root of N. Let $\alpha$ be chosen at random from $[2^{k_2}]=\{1, \ldots, 2^{k_2}\}$, where $k_2<k$. Now let $C=x/\alpha \in Z_N^*$. (We neglect the small chance that $\alpha \notin Z_N^*$ since in that case one would directly factor N.) Now consider the problem of factoring N given N,y,C.

The obvious approach is to find x, since $\gcd(x-y,N)$ is a non-trivial factor of N. The obvious approach to this is to search exhaustively for $\alpha$, which takes $2^{k_2}$ time. Of course, this may not be the best way.

Let $T(k_2)$ be the time to factor N given N,y,C. We do not know exactly what is $T(k_2)$. But we know the following. If $k_2=0$ then $T(k_2)$ is something small and feasible, because in this case $\alpha=1$ and C=x, and so $\gcd(C-y,N)$ is a non-trivial factor of N. On the other hand if $k_2=k-1$ then $T(k_2)$ is essentially the time to factor N. We can make the natural assumption that $T(\cdot)$ is an increasing function of $k_2$. This means that given any desired target time $2^t \leq T(k-1)$, there is some $k_2$ for which $T(k_2)=2l$.

Now we can use this problem for the encapsulation. Specifically, in Step 2.1 of the protocol, the user doesn't pick K. Rather he picks a random $k_2$ bit $\alpha$ and lets $C=x/\alpha$ mod N. Now he escrows C as before. The rest is similar.

In general, any time-delay problem can be used with the above "cut and choose" approach. However, it is best to have one where we know, and can pick, an appropriate $k_2$. In the factoring based problem we have discussed just now, $k_2$ exists, but we aren't sure what its value is. However using private key ciphers, we are better able to pin down $k_2$.

Finally, as we already noted, a good problem to use is the squaring based time-lock puzzle of [RSW] because here even parallelism won't help find the solution faster.

Weaker assumptions

We now provide a more extended description of our basic verifiability process outlined above. In particular, we detail the weaker condition than claw-free pairs of permutations which we said suffices.

Suppose that for every public key P (and matching secret key S), there exists many ordered pairs $T_i^P=(t_i^0, t_i^1)$ such that: One member of the pair, reveals no information about S; Given both members of a pair, S is easy to compute; Given S, it is easy to generate pairs $T_i^P$, and given S and $t_i^b$, it is easy to find the matching $t_i^{1-b}$; It is easy to generate one of the members of a pair $T_i^P$ from P even without knowing S.

At setup time users publish their public key P, and do as follows.

Send all the governement trustees commitments to L (say L=100) pairs $T_i^P$. The commitment should be such that computing $t_i^1, t_i^2$ is impossible for the government, and yet the user cannot change the value of $t_i^1, t_i^2$ after committal.

The trustees verify that indeed the values committed to in the previous steps define proper pairs. Note that this can be done without decommitting via a zero-knowledge proof with respect to the committed values.

Encrypt for each pair $T_i^P$, the first member of the pair $t_i^1$ using key $K_i$ of "short" length (i.e that is feasible for the government to recover for individual wiretaps), using one of the encryption algorithms E discussed in the previous section. Let $C_i=E(t_i^1)$. Now the users "escrows" $C_i$ for all i=1 ... L. The escrow can be done as a split-key escrow by sharing $C_i$ using a shamir secret-sharing scheme among the trustees, or any other secret sharing scheme, or simply sending the entire $C_i$ for all i to the government (if there is only one trustee).

The trustees flip L coins $d_1, \ldots, d_L$ and send them to the user. If $d_i=1$, the user sends all the trustees, $K_i, t_i^1$ and all the shares sent to all the trustees of $C_i$. Each trustee checks for each i that indeed his share is among the shares revealed for each $C_i$, that $K_i$ is indeed short as promised, and that the commitment to $t_i^1$ was properly decomitted. If $d_i=0$, the user decommits $t_i^2$ to all the trustees.

Now, the probability that there exists an i such that $d_i=0$, $K_i$ is of a short length, and the shares that trustees got for i properly define a $C_i$ such that $C_i=E_{k_i}(t_2^i)$, is about $1-1/2^L$.

When the government gets authority to wiretap, it can recover the two members of the pair $T_i^P$ for some i (the above argument guarantees that with very high probability such i exists) as follows: pool together all shares of $C_i$, find $K_i$, decrypt $C_i=E_{k_i}(t_i^2)$ to find $t_i^2$, and finally use the two members of $T_i^P$ recovered to find S.

Other Embodiments

Other Embodimentsi are within the following claims. For example,

Although most key-escrow suggestions pertains only to the individual versus government issue, we suggest there are other applications. Key escrow may be useful in the confines of a single, large organization, which has very much the same kinds of concerns as a government. Employees want privacy, but to protect business interests, the top managers would like some balance enabling them to recover the key of an employee they suspect of anti-organizational actions. Key escrow seems a natural solution, with the trustees now being some collection of vice presidents, and the users being employees. The possibility of a hostile takeover, or sudden change in policy, in a corporation, is, perhaps more likely than a sudden change in government, at least in the U.S., and partial key escrow or more generally time-delay key escrow may be quite attractive in this setting.

Choice of Secret Key. We note that the secret key in all our methods can be chosen either by the individual (e.g. as in Micali's Fair Key cryptosystem), by a trusted sub-agency (e.g Clipper like), or by the individual and authority in joint effort (e.g. as in the method proposed by Kilian-Leighton). This is obvious by standard ideas from the litereature.

Removing interaction. Our protocols as specified ask for several exchanges of messages between the parties. That is, the user sends a message to the trustees, who respond, then the user responds, etc. However, all our protocols can be made non-interactive. (That is, the user sends a single message, on receipt of which the trustees decide whether or not to certify the key.) There is a generic way to do this. Let's illustrate using the first key-escrow scheme for Diffie-Hellman public-key cryptosystem described above as an example. The only part there that currently is interactive is the proof of knowledge. The interaction can be eliminated by specifying the challenges via a hash of the committals and other information. (See [BeRo] for discussions of the random oracle setting in which this can be modeled, definitions of zero-knowledge in this setting, and discussions of the meaningfulness of instantiating random oracles via hash functions.) The same thing applies to our other schemes: the challenges issued by a party can always be set to a hash of the other quantities involved in the protocol.

Escrow of session keys. The above ideas have been discussed only in terms of long-lived keys. But one can also escrow session keys in this manner, moreover verifiably if desired.

The setup is as follows. Parties A and B wish to establish a secure communication channel. It is assumed they have each other's public keys, or already share a long lived secret key. Now they use a session key exchange protocol to come up with a session key K. This is a short lived key which will be used to encrpte data in that session, and thereafter discarded. The goal is to enable law enforcement to gain partial access to K should they choose to wiretap. This will enable them to recover some piece of the key, and the rest they must find by exhaustive search.

We stress that in the schemes we will now describe, there is no communication between users and trustees. Instead a LEAF (law enforcement access field) is transmitted from A to B. Should law enforcement get wiretap authorization, they would recover the LEAF by wiretapping. A quorum of trustees, given the LEAF, can recover the session key K.

There are several advantages to escrowing session keys. One is that these keys have a short lifetime, so once the warrant has expired, law enforcement access dies. The other is that no communcation between users and government is required, as indicated above.

Say the session key K is a 56 bit DES key. Let $pk_i$ denote the public encryption key of trustee i. Let's now describe how to accomplish time-delayed split key escrow. For simplicity, first assume we want a scheme in which the key is recoverable if all trustees combine and un-recoverable if any small number combines. User A lets K' be the first 8 bits of K and then chooses $K_1, \ldots, K_n$, so that $K'=K_1 \oplus \ldots \oplus K_n$. She lets $C_i$ be the encryption of $K_i$ under $pk_i$. Then $C_1, \ldots, C_n$ is the LEAF, transmitted to B. If all the trustees combine, they can obtain K' by decrypting the ciphertexts. Then they are left with a $2^{48}$ time search to recover K.

More generally, we may want t+1 trustees to be able to recover the key but not t of them, where $1 \leq t < n$. Then we can use the secret sharing technique. Let K' be the constant term of a otherwise random degree t polynomial. Let $K_i$ be the value of the polynomial at i, and let $C_i$ be the encryption of this under $pk_i$.

This scheme however is not verifiable. We add the following kind of verifiability. A third party (not law enforcement) can wiretap to verify that A has done as she was supposed to. Since this party won't get any information about K, such verification wiretaps may be acceptable. We can add verifiability via zero-knowledge proofs which would now be part of the LEAF.

Time Bounded Wiretapping: It is often desirable that wiretapping will be made possible for a short and bounded amount of time. To achieve time-bounded wiretapping different session-keys can be used for short time intervals as specified above. Several other suggestions (including using secure chips whose memory cannot be altered or read have been made in the litreature. Any one of them can be easily combined with our methods, as they work with any escrowing method.

Verifying that Encryption Algorithm is Computed as Specified For any Key-Escrow system in general, and for Encapsulated Key Escrow systems in particular, it is useful for the government to be able to determine (without wiretapping or recovering trustees pieces) whether a given cyphertext has been generated properly. Namely, whether the cyphertext being transmitted from sender to receiver is the result of applying the prescribed encryption algorithm (whose keys were escrowed in one of the prescribed ways as above) to some plaintext by the sender. There are standard ways to allow the government to make such determination, by having the sender attach a tag to the cyphertext which is a sender generated non-interactive zero-knowledge proof of knowledge of the plaintext. Other standard methods use secure chip or secure transportable devices (e.g smart cards) for encryption, where the secure device generates automatically, for every message encrypted, a certificate (which can be verified by the government or and the trustees) that the message was encrypted properly.

REFERENCES

[BeGw] M. BELLARE AND S. GOLDWASSER. Verifiable partial key escrow. Technical Report number CS95-447, Dept of CS and Engineering, UCSD, October 1995.

[BMO] M. BELLARE, S. MICALI AND R. OSTROVSKY. The (True) Complexity of Statistical Zero-Knowledge. Proceedings of the 22nd Annual Symposium on Theory of Computing, ACM, 1990.

[BeGr] M. BELLARE AND O. GOLDREICH. On defining proofs of knowledge. Advances in Cryptology—*Crypto 92 Proceedings*, Lecture Notes in Computer Science Vol. 740, E. Brickell ed., Springer-Verlag, 1992.

[BeRi] M. BELLARE AND R. RIVEST. Translucent cryptography—An alternative to key escrow and its implementation via fractional oblivious transfer. MIT/ LCS TM 683, February 1996. Available at http://www-cse.ucsd.edu/users/mihir or http://theory.lcs.mit.edu/~rivest.

[BeRo] M. BELLARE AND P. ROGAWAY. Random oracles are practical: a paradigm for designing efficient protocols. Proceedings of the First Annual Conference on Computer and Communications Security, ACM, 1993.

[BeRo] M. BELLARE AND P. ROGAWAY. Optimal asymmetric encryption. Advances in Cryptology—*Eurocrypt 94 Proceedings*, Lecture Notes in Computer Science Vol. 950, A. De Santis ed., Springer-Verlag, 1994.

[BKOSW] T. BETH, H. KNOBLOCH, M. OTTEN, G. SIMMONS, AND P. WICHMANN. Towards acceptable key escrow systems. Proceedings of the Second Annual Conference on Computer and Communications Security, ACM, 1994.

[Blk] G. BLAKLEY. Safeguarding cryptographic keys. AFIPS Conference Proceedings, June 1979.

[Blz] M. BLAZE. Protocol failure in the escrowed encryption standard. Proceedings of the Second Annual Conference on Computer and Communications Security, ACM, 1994.

[BlGo] M. BLUM AND S. GOLDWASSER. An efficient probabilistic public-key encryption that hides all partial information. Advances in Cryptology—*Crypto 84 Proceedings*, Lecture Notes in Computer Science Vol. 196, R. Blakely ed., Springer-Verlag, 1984.

[BoDa] J. BOYAR AND I. DAMGÅRD. A discrete logarithm blob for non-interactive XOR gates. DAIMI PB—327, Computer Science Department, Aarhus University, August 1990.

[BCY] G. BRASSARD, C. CRÉPEAU AND M. YUNG. Constant round perfect zero knowledge computationally convincing protocols. *Theoretical Computer Science*, Vol. 84, No. 1, 1991.

[CGMA] B. CHOR, S. GOLDWASSER, S. MICALI, AND B. AWERBUCH. Verifiable secret sharing and achieving simultaneity in the presence of faults. Proceedings of the 27th Symposium on Foundations of Computer Science, IEEE, 1986.

[Cr] R. CRAMER. Private communication, January 17, 1996.

[CDS] R. CRAMER, I. DAMGÅRD AND B. SCHOENMAKERS. Proofs of partial knowledge and simplified design of witness hiding protocols. Advances in Cryptology—*Crypto 94 Proceedings*, Lecture Notes in Computer Science Vol. 839, Y. Desmedt ed., Springer-Verlag, 1994.

[Den] D. DENNING. To tap or not to tap. *CACM* 1993.

[DeSm] D. DENNING AND M. SMID. Key escrowing now. *IEEE Communications Magazine*, September 1994.

[Des] Y. DESMEDT. Securing traceability of ciphertexts: towards a secure software key escrow system. Advances in Cryptology—*Eurocrypt 95 Proceedings*, Lecture Notes in Computer Science Vol. 921, L. Guillou and J. Quisquater ed., Springer-Verlag, 1995.

[DiHe] W. DIFFIE AND M. HELLMAN. New directions in cryptography. *IEEE Trans. Info. Theory* IT-22, pp. 644–654, November 1976.

[FeSh] U. FEIGE AND A. SHAMIR. Witness Indistinguishable and Witness Hiding Protocols. Proceedings of the 22nd Annual Symposium on Theory of Computing, ACM, 1990.

[Fel] P. FELDMAN. A practical scheme for non-interactive verifiable secret sharing. Proceedings of the 28th Symposium on Foundations of Computer Science, IEEE, 1987.

[FrYu] Y. FRANKEL AND M. YUNG. Escrow encryption systems visited: attacks, analysis and designs. Advances in Cryptology—*Crypto 95 Proceedings*, Lecture Notes in Computer Science Vol. 963, D. Coppersmith ed., Springer-Verlag, 1995.

[GMW] O. GOLDREICH, S. MICALI AND A. WIGDERSON. Proofs that yield nothing but their validity, or all languages in NP have zero-knowledge proof systems. *JACM*, Vol. 38, No. 1, July 1991.

[Gw] S. GOLDWASSER. Verifiable partial disclosure of secret cryptographic keys, Preprint, Aug. 30th 1995.

[GMRa] S. GOLDWASSER, S. MICALI, AND C. RACKOFF. The knowledge complexity of interactive proofs. *SIAM J. Comput.* Vol. 18, No. 1, 186–208, February 1989.

[GMRi] S. GOLDWASSER, S. MICALI AND R. RIVEST. A digital signature scheme secure against adaptive chosen-message attacks. *SIAM Journal of Computing*, 17(2):281–308, April 1988.

[KiLe] J. KILIAN AND T. LEIGHTON. Fair cryptosystems revisited. Advances in Cryptology—*Crypto 95 Proceedings*, Lecture Notes in Computer Science Vol. 963, D. Coppersmith ed., Springer-Verlag, 1995.

[Len] H. LENSTRA. Factoring integers with elliptic curves. *Annals of Math* Vol. 126, pp. 649–673, 1987.

[LWY] A. LENSTRA, P. WINKLER AND Y. YACOBI. A key escrow system with warrant bounds. Advances in Cryptology—*Crypto 95 Proceedings*, Lecture Notes in Computer Science Vol. 963, D. Coppersmith ed., Springer-Verlag, 1995.

[Mi1] S. MICALI. Fair public key cryptosystems. Advances in Cryptology—*Crypto 92 Proceedings*, Lecture Notes in Computer Science Vol. 740, E. Brickell ed., Springer-Verlag, 1992.

[Mi2] S. MICALI. Guaranteed partial key escrow. MIT/LCS TM-537, September 1995.

[MiSi] S. MICALI AND R. SIDNEY. A simple method for generating and sharing pseudorandom functions, with applications to clipper-like key escrow systems. Advances in Cryptology—*Crypto 95 Proceedings*, Lecture Notes in Computer Science Vol. 963, D. Coppersmith ed., Springer-Verlag, 1995.

[Od] A. ODLYZKO. CryptoBytes, RSA Lab Newsletter, Vol 1, No.2.

[Pe1] T. PEDERSON. Distributed provers with applications to undeniable signatures. Advances in Cryptology—*Eurocrypt 91 Proceedings*, Lecture Notes in Computer Science Vol. 547, D. Davies ed., Springer-Verlag, 1991.

[Pe2] T. PEDERSON. Non-interactive and information theoretic secure verifiable secret sharing. Advances in Cryptology—*Crypto 91 Proceedings*, Lecture Notes in Computer Science Vol. 576, J. Feigenbaum ed., Springer-Verlag, 1991.

[Ri1] R. RIVEST. The RC5 encryption algorithm. Manuscript.

[RSW] R. RIVEST, A. SHAMIR AND D. WAGNER. Time-lock puzzles and timed-release crypto. Manuscript available at http://theory.lcs.mit.edu:80/~rivest.

[RSA] R. RIVEST, A. SHAMIR, L. ADLEMAN. Methods for Obtaining Digital Signatures and Public Key Cryptosystems. *CACM* 1978, vol 21.

[Sh1] A. SHAMIR. How to share a secret. *CACM*, Vol. 22, No. 11, 1979.

[Sh2] A. SHAMIR. Private communication made at Crypto 95, August 1995.

We claim:

1. A method of providing different levels of computational difficulty for recovering an encrypted communication, so that a first entity experiences less computational difficulty than other entities, the method comprising the steps of:

encrypting the communication so that an entity in possession of a secret key can recover the encrypted communication without computational difficulty;

providing the first entity with first information about the secret key, the first information comprising weakly-encrypted information about the secret key;

the weakly encrypted information being enough information that the encrypted communications can be recovered with a predetermined level of computational difficulty less than that for the other entities.

2. The method of claim 1 wherein the weakly encrypted information is divided into a plurality of portions separately escrowed with different representatives of the first entity.

3. The method of claim 2 wherein the first entity is the government and the trustees are obligated under certain conditions to disclose the escrowed portions to the government, whereby the government can monitor the encrypted communications.

4. The method of claim 2 wherein the first entity must gain possession of a predetermined minimum number of the escrowed portions before the undisclosed portion of the secret key can be recovered within the predetermined level of computational difficulty.

5. The method of claim 1 wherein substantially the entire secret key is weakly encrypted to form the weakly encrypted information.

6. The method of claim 5 wherein the weakly encrypted information is divided into a plurality of portions separately escrowed with different trustees.

7. The method of claim 1 wherein the computational difficulty incurred in recovering the encrypted communication results from the need to decrypt the weakly encrypted information about the secret key.

8. The method of claim 1 wherein the encryption is private key encryption.

9. The method of claim 1 wherein the encryption is public key encryption.

10. A method of providing different levels of computational difficulty for recovering a public-key encrypted communication, so that a first entity experiences less computational difficulty than other entities, the method comprising the steps of:

encrypting the communication using a public key for which there exists a secret key, so that with possession of the secret key the encrypted communication can be recovered without computational difficulty;

providing the first entity with first information about the secret key;

the first information being less than a full description of the secret key but enough information that the encrypted communication can be recovered with a predetermined level of computational difficulty less than that for the other entities;

wherein the first information comprises weakly encrypted information about the secret key.

11. A method of providing different levels of computational difficulty for recovering an encrypted communication, so that a first entity experiences less computational difficulty than other entities, the method comprising the steps of:

encrypting the communication so that an entity in possession of a secret key can recover the encrypted communication without computational difficulty;

providing the first entity with first information about the secret key;

the first information being less than a full description of the secret key but enough information that the encrypted communication can be recovered with a predetermined level of computational difficulty less than that for the other entities;

providing the first entity with verification information with which the first entity can verify that the first information provided is sufficient for recovery to be achieved within the predetermined level of computational difficulty;

wherein the first information comprises weakly encrypted information about the secret key.

12. A method of providing different levels of computational difficulty for recovering an encrypted communication, so that a first entity experiences less computational difficulty than other entities, the method comprising the steps of:

encrypting the communication so that an entity in possession of a secret key can recover the encrypted communication without computational difficulty;

providing the first entity with first information about the secret key;

the first information being less than a full description of the secret key but enough information that the encrypted communication can be recovered with a predetermined level of computational difficulty less than that for the other entities;

providing the first entity with verification information with which the first entity can verify that the first information provided is sufficient for recovery to be achieved within the predetermined level of computational difficulty;

wherein the first information provided to the first entity comprises information about a disclosed portion of the secret key, wherein there remains an undisclosed portion of the secret key, and wherein the verification information is used to verify the size of the undisclosed portion and that the disclosed portion is a part of the secret key.

13. The method of claim 12 wherein the secret key may be changed subsequent to escrowing of the disclosed portion, so that the undisclosed portion is increased in size without any change to the disclosed portion, thereby avoiding a new escrowing of the disclosed portion or a new verification.

14. A method of providing different levels of computational difficulty for recovering a public-key encrypted communication, so that a first entity experiences less computational difficulty than other entities, the method comprising the steps of:

encrypting the communication using a public key for which there exists a secret key, so that with possession of the secret key the encrypted communication can be recovered without computational difficulty;

providing the first entity with first information about the secret key;

the first information being less than a full description of the secret key but enough information that the encrypted communication can be recovered with a predetermined level of computational difficulty less than that for the other entities;

wherein the first information provided to the first entity comprises information about a disclosed portion of the secret key, and wherein there remains an undisclosed portion of the secret key;

wherein the disclosed portion comprises some of the bits of the secret key, the verification information is used to verify that the number of undisclosed bits is small enough to permit recovery to be within the predetermined level of computational difficulty, and that the disclosed bits are part of the secret key.

* * * * *

UNITED STATES PATENT AND TRADEMARK OFFICE
CERTIFICATE OF CORRECTION

PATENT NO. : 5,768,388

DATED : June 16, 1998

INVENTOR(S) : Shafi Goldwasser and Mihir Bellare

It is certified that error appears in the above-identified patent and that said Letters Patent is hereby corrected as shown below:

Col. 7, line 22, "tro" should be --to--.

Col. 7, line 31, "thought" should be --though--.

Col. 8, line 5, "paremter" should be --parameter--.

Col. 8, line 52, " $g^{S_m}$ " should be -- $g^{S_B}$ --.

Col. 8, line 55, "This" should be --These--.

Col. 9, line 16, "a" should be --$\alpha$--.

Col. 9, line 25, "z" should be --x--.

Col. 9, line 57, "a" should be --$\alpha$--.

Col. 11, line 7, "Bob" should be --B--.

Col. 12, after line 18, insert --System Wide Constants.--.

Col. 13, line 5, " $A_1 = g^{u_i} h^{u_i}$ " should be -- $A_1 = g^{a_i} h^{u_i}$ --.

Col. 13, line 12, " $P = g^{\alpha + \alpha_0 2^0}$ " should be -- $P = g^{x + \alpha_0 2^0}$ --.

UNITED STATES PATENT AND TRADEMARK OFFICE
CERTIFICATE OF CORRECTION

PATENT NO. : 5,768,388

DATED : June 16, 1998

INVENTOR(S) : Shafi Goldwasser and Mihir Bellare

It is certified that error appears in the above-identified patent and that said Letters Patent is hereby corrected as shown below:

Col. 13, line 27, "a" should be --$\alpha$--.

Col. 14, line 17, "a" should be --$\alpha$--.

Col. 14, line 20, "a" should be --$\alpha$--.

Col. 14, line 37, "a" should be --$\alpha$--.

Col. 16, line 36, ";" should be -- - --.

Col. 16, line 39, "$Z_{di}*$" should be --$Z_{Mi}*$--.

Col. 17, line 9, "$p_1$" should be --$p_2$--.

Col. 17, line 12, delete the second occurrence of "the".

Col. 17, line 16, "Secone" should be --Second--.

Col. 18, line 19, after "will", insert --be--. (our error)

Col. 18, line 36, before "Take", insert --The Basic Idea.--.

Col. 19, line 60, "$f_{1(y)=P\cdot g}{}^y$" should be --$f_{1(y)}=P\cdot g^y$--.

Col. 20, line 20, after "will", insert --be--.

UNITED STATES PATENT AND TRADEMARK OFFICE
CERTIFICATE OF CORRECTION

PATENT NO. : 5,768,388

DATED : June 16, 1998

INVENTOR(S) : Shafi Goldwasser and Mihir Bellare

It is certified that error appears in the above-identified patent and that said Letters Patent is hereby corrected as shown below:

Col. 20, line 25, delete entire line and insert --The Description of the Protocol.--.

Col. 20, line 37, "$C=E_K(Z)$" should be --$C=E_K(X)$--.

Col. 21, line 47, "$1-2^i$" should be --$1-2^{-1}$--.

Col. 22, line 7, "$T(k_2)=21$" should be --$T(k_2)=2^1$--.

Col. 22, line 42, "$t_f^1$" should be --$t_I^1$--.

Col. 23, line 4, "Although" should be --although--.

Col. 23, line 52, "encrpte" should be --encrypte--.

Col. 24, line 58, "pseudorandom" should be --pseudo-random--.

Signed and Sealed this

Second Day of May, 2000

Attest:

Q. TODD DICKINSON

*Attesting Officer*      *Director of Patents and Trademarks*